US012647938B2

(12) United States Patent
Skoglar et al.

(10) Patent No.: US 12,647,938 B2
(45) Date of Patent:      Jun. 2, 2026

(54) SYSTEMS AND METHODS FOR PRECISION LOCALIZATION OF SHORT-RANGE WIRELESS BEACONS

(71) Applicant: Verizon Patent and Licensing Inc., Basking Ridge, NJ (US)

(72) Inventors: Per Skoglar, Linköping (SE); David Törnqvist, Linghem (SE); Rickard Karlsson, Linkoping (SE); Carl Martin Estgren, Linkoping (SE); Clas Veibäck, Söderköping (SE)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 296 days.

(21) Appl. No.: 18/598,101

(22) Filed: Mar. 7, 2024

(65) Prior Publication Data

US 2025/0287347 A1      Sep. 11, 2025

(51) Int. Cl.
H04W 64/00        (2009.01)
H04B 17/309      (2015.01)

(52) U.S. Cl.
CPC ........ H04W 64/006 (2013.01); H04B 17/309 (2015.01)

(58) Field of Classification Search
CPC ........................... H04W 64/006; H04B 17/309

USPC ....................................................... 455/456.1
See application file for complete search history.

(56)                    References Cited

U.S. PATENT DOCUMENTS

| | | | |
|---|---|---|---|
| 9,560,622 B2 * | 1/2017 | Gupta ................... | H04W 24/02 |
| 11,218,839 B1 * | 1/2022 | Huberman ............. | G01D 21/02 |
| 2008/0039114 A1 * | 2/2008 | Phatak ................ | G01S 5/02521 |
| | | | 455/456.1 |
| 2014/0087739 A1 * | 3/2014 | Weaver ................. | H04W 16/18 |
| | | | 455/436 |
| 2020/0084574 A1 * | 3/2020 | Kwon ................... | H04W 4/021 |

* cited by examiner

*Primary Examiner* — Don N Vo

(57)                    ABSTRACT

A system described herein may determine, based on wireless metrics associated with wireless signals transmitted by a first set of devices, a first reference map associated with a particular space, such as a warehouse, a facility, or the like. The system may determine, based on the first reference map and further based on wireless metrics associated with wireless signals transmitted by the first set of devices and received by a second set of devices, a second reference map associated with the particular space; determine, based on the second reference map and further based on wireless metrics associated with wireless signals transmitted by a third set of devices and received by the second set of devices, locations within the particular space of the third set of devices; and output information indicating the locations, within the particular space, of the third set of devices.

20 Claims, 14 Drawing Sheets

Location of fixed
beacon 203-1

303-1  303-2

Location ⟶

KEY

○ Possible locations of active tracker 303-1
based on fixed beacon 203-1 location map □ Possible locations of active tracker 303-2
based on fixed beacon 203-1 location map

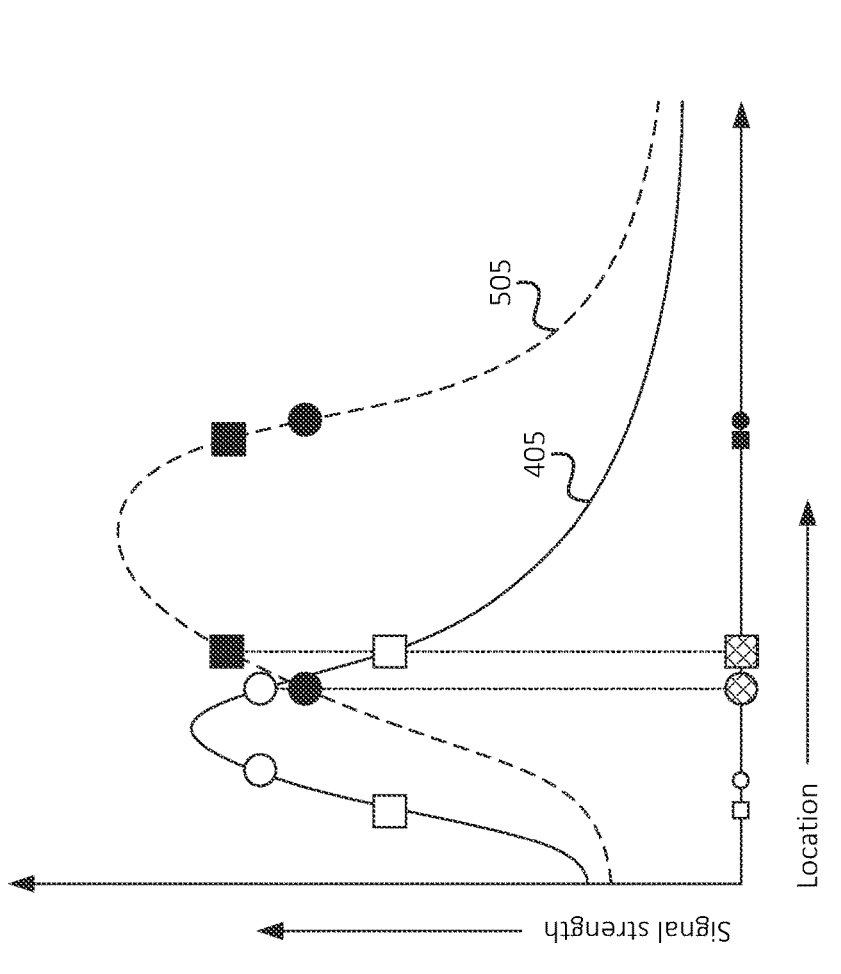
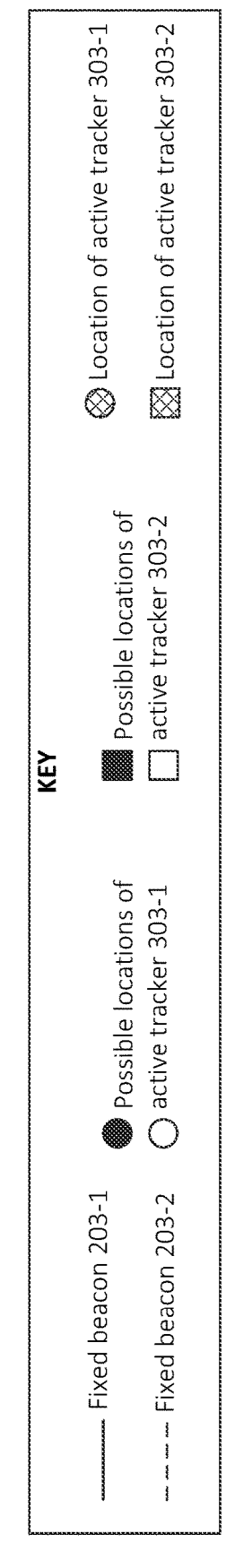
FIG. 6

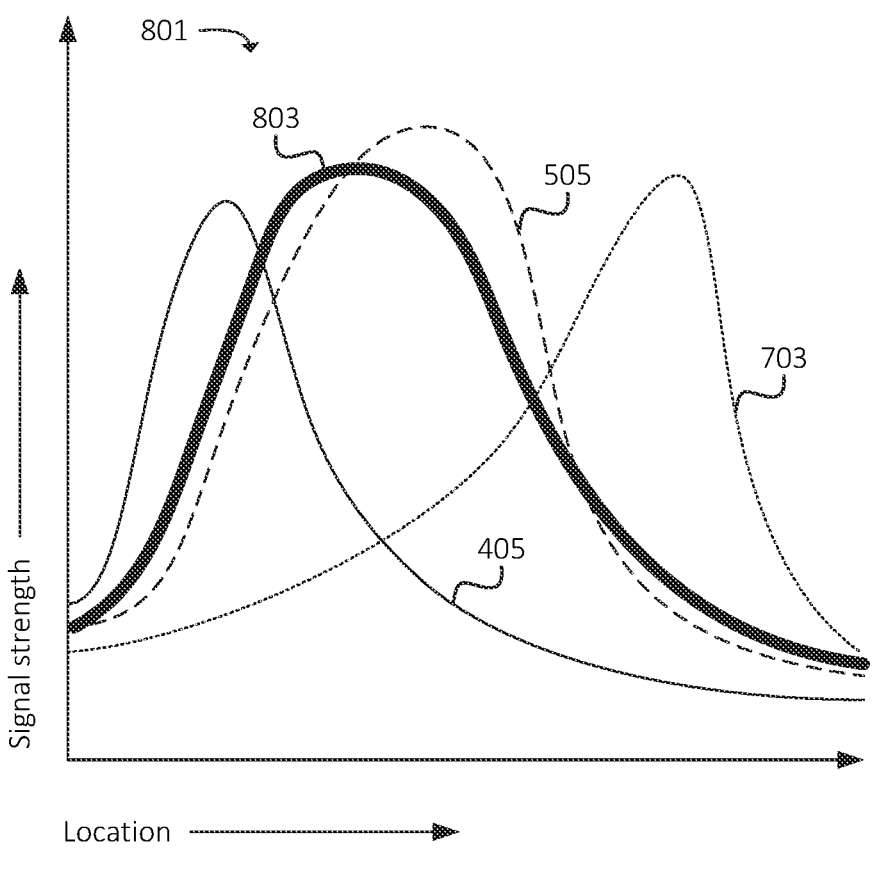
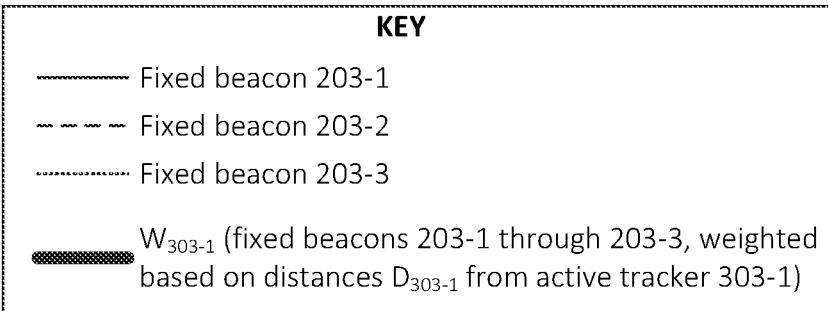
FIG. 8

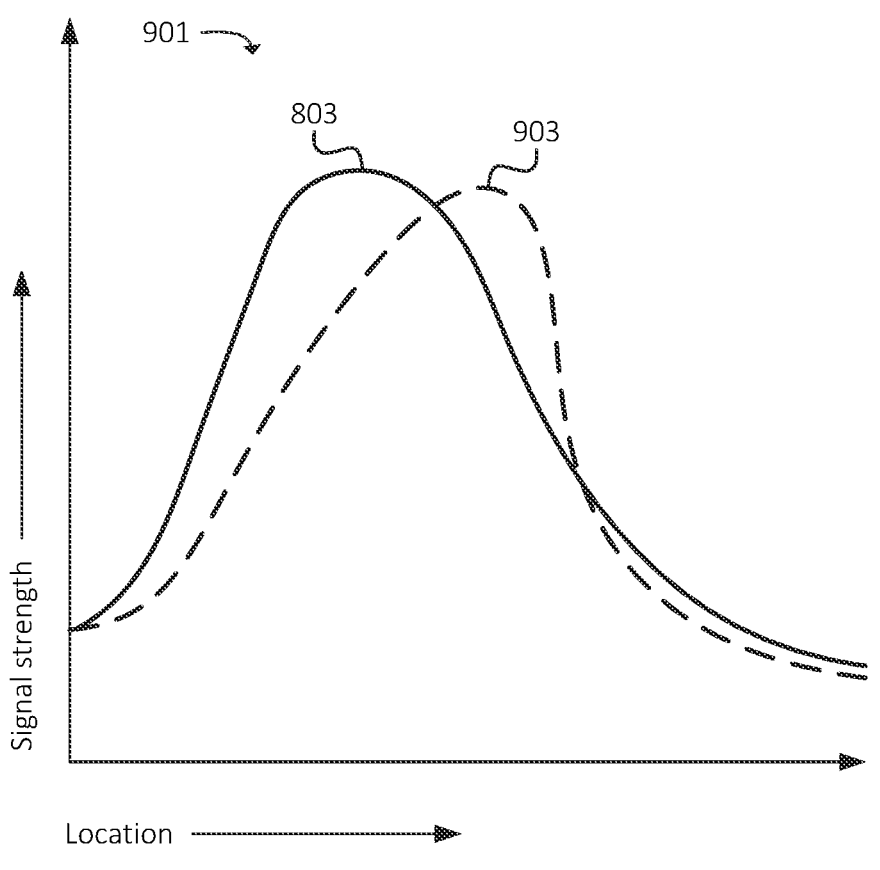
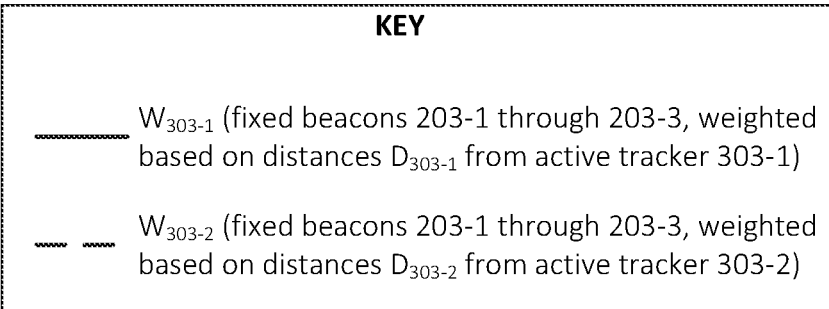
FIG. 9

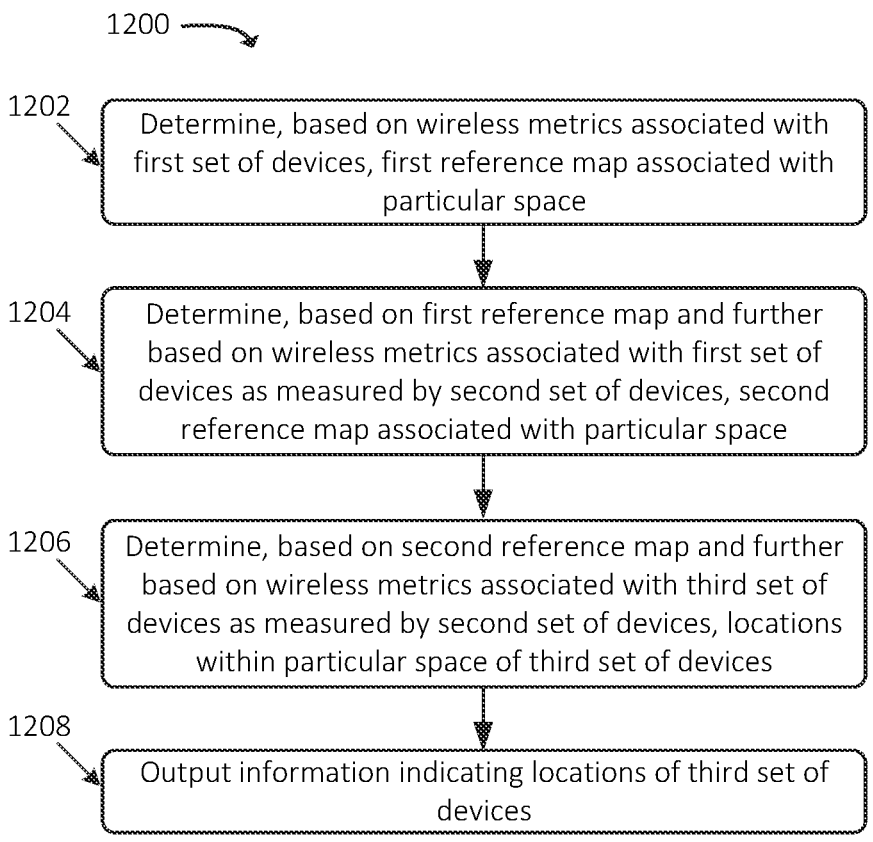

1200

1202 Determine, based on wireless metrics associated with first set of devices, first reference map associated with particular space 1204 Determine, based on first reference map and further based on wireless metrics associated with first set of devices as measured by second set of devices, second reference map associated with particular space 1206 Determine, based on second reference map and further based on wireless metrics associated with third set of devices as measured by second set of devices, locations within particular space of third set of devices 1208 Output information indicating locations of third set of devices

Bus
1410

SYSTEMS AND METHODS FOR PRECISION LOCALIZATION OF SHORT-RANGE WIRELESS BEACONS

BACKGROUND

Wireless networks provide wireless connectivity to User Equipment ("UEs"), such as mobile telephones, tablets, Internet of Things ("IoT") devices, Machine-to-Machine ("M2M") devices, or the like. UEs may be used for location-based services, such as receiving, determining, reporting, etc. their own respective location information or location information of other devices, objects, etc. For example, a particular UE may utilize Global Positioning System ("GPS")-based techniques to determine its own geographical location, a wireless network may use triangulation techniques to determine the geographical location of the UE, etc.

BRIEF DESCRIPTION OF THE DRAWINGS

FIGS. 4-6 illustrate examples of determining locations of active trackers based on respective beacon signal/location maps, in accordance with some embodiments;

FIGS. 7-10 illustrate examples of determining weighted averages of beacon signal/location maps based on wireless signal metrics determined by active trackers, in accordance with some embodiments;

FIG. 12 illustrates an example process for localizing mobile beacons within a particular space using wireless fingerprinting techniques, in accordance with some embodiments;

DETAILED DESCRIPTION OF EXAMPLE EMBODIMENTS

The following detailed description refers to the accompanying drawings. The same reference numbers in different drawings may identify the same or similar elements.

Embodiments described herein may provide the precise localization of beacon devices (e.g., wireless signal-emitting devices), leveraging the wireless capabilities of one or more network devices (e.g., devices with wireless connectivity, such as UEs) to facilitate the precise localization of relatively many such beacon devices with the assistance of relatively few network devices. As such, the beacon devices may be able to have relatively basic wireless functionality or hardware (e.g., a transmitter with the ability to transmit wireless signals, without a receiver that has the ability to receive wireless signals), but may still be able to be localized with the precision of network devices (e.g., devices that include wireless transmitters and receivers and are able to send and receive wireless signals). In this sense, fewer devices with wireless connectivity and access to a wireless network may be used when determining the precise locations of numerous wireless beacon devices.

Further, in accordance with some embodiments, the precise locations of such beacon devices may be able to be determined within a given space or geographical region (e.g., a floor of an office building, a sports venue, a warehouse floor, etc.). Such embodiments may be beneficial in scenarios where wireless network coverage (e.g., signal strength or quality of radio signals to or from a base station of a wireless network) is lacking, such as inside buildings, in remote geographical areas, etc. Additionally, in accordance with some embodiments, the precise locations of beacon devices may be able to be performed in three dimensions. Such embodiments may provide enhanced localization as compared to two-dimensional location determination techniques (e.g., the latitude and longitude coordinates of a given device).

Figure 1:
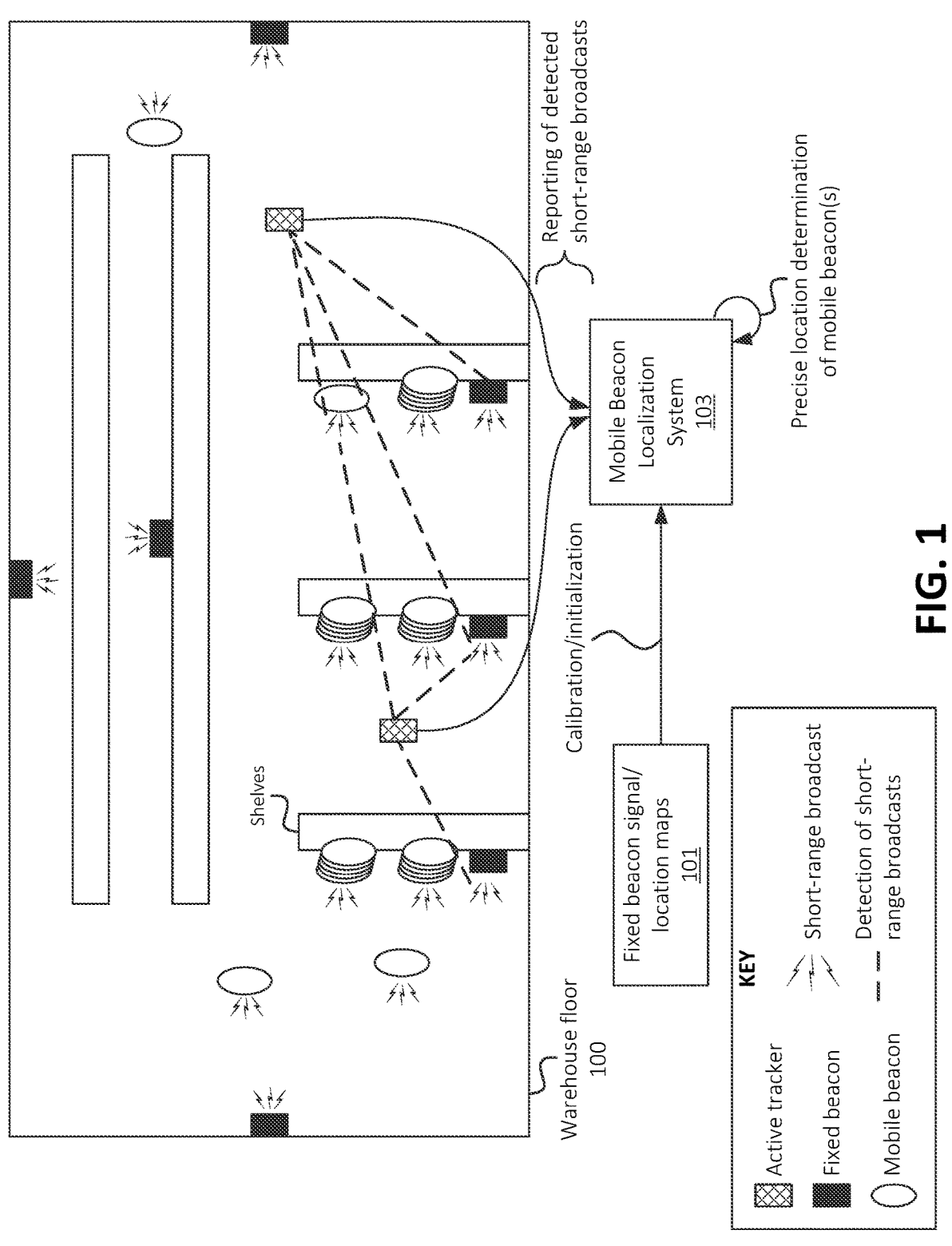
FIG. 1 illustrates an example overview of one or more embodiments described herein.

FIG. 1 illustrates an example overview of some embodiments. In this example, warehouse floor 100 is shown as an example space in which fixed beacons, mobile beacons, and active trackers may be located. Other physical features may be present on warehouse floor as well, such as walls, shelves, doorways, corridors, etc. Such physical features may potentially interfere with or otherwise alter the transmission or reception of wireless signals of devices that are present on warehouse floor 100.

As referred to herein, "fixed beacons" and "mobile beacons" may be capable of short-range communications such as Bluetooth®, Near Field Communication ("NFC"), or other short-range wireless communications (e.g., communications in which radios, antennas, transceivers, etc. that are physically proximate to each other may wirelessly communicate). In some scenarios, some or all of the fixed beacons and/or mobile beacons may only be capable of transmitting (e.g., broadcasting) wireless signals, but may not be capable of receiving wireless signals. For example, one or more fixed beacons and/or mobile beacons may include wireless transmitters, but may not include wireless receivers. As another examples, fixed beacons and/or mobile beacons may include wireless receivers and transmitters, but may not be configured or able to use such receivers (e.g., may be configured to power off the receivers during certain times of the day as a power saving measure). In any event, embodiments described herein may determine the precise locations of the mobile beacons, without requiring that the mobile beacons or the fixed beacons receive any wireless signals from any source.

Fixed beacons may be attached, affixed, etc. within a given space, such as on walls, floors, ceilings, shelves, etc. of warehouse floor 100. In accordance with one or more embodiments described herein, one or more fixed beacon signal/location maps 101 may be generated or received. Fixed beacon signal/location maps 101 may represent a wireless "fingerprint," within the space (e.g., in two or three dimensions), for each fixed beacon. Fixed beacon signal/location maps 101 may indicate, for each fixed beacon within the space, a set of wireless metrics associated with particular respective locations within the space. Generally, for example, signal strength for a particular fixed beacon may be relatively high for locations that are near the fixed beacon, while signal strength for the same fixed beacon may be relatively low for locations that are far from the fixed beacon and/or have intervening objects or room features in between them. In this sense, each particular point, sub-region, etc. within the space may be associated with a "fingerprint" of wireless metrics of some or all of the fixed beacons within the space.

Figure 2:
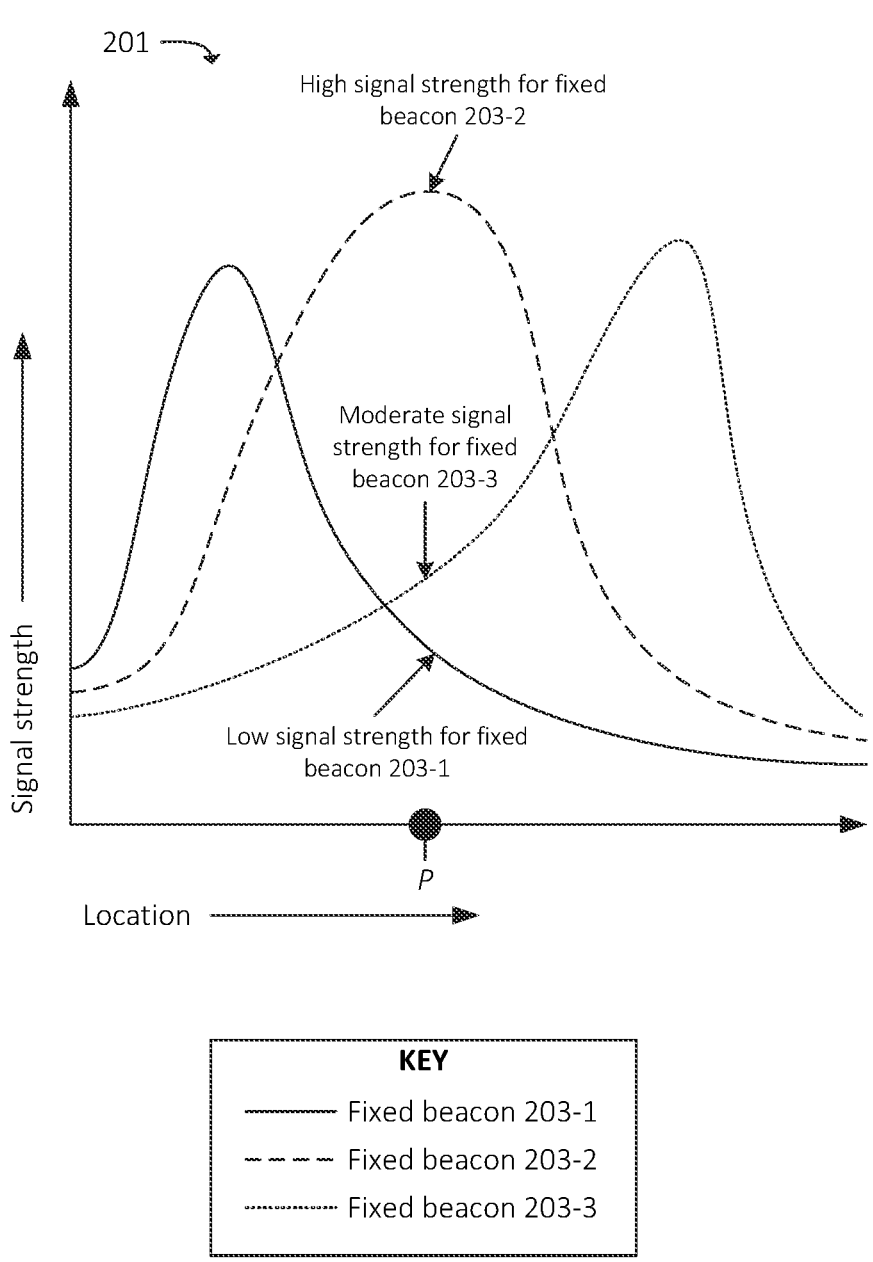
FIG. 2 illustrates an example beacon signal/location map that may be determined or used in accordance with some embodiments.

FIG. 2 illustrates graph 201, which may represent an example fixed beacon signal/location map 101 that is based on three example fixed beacons 203-1, 203-2, and 203-3. As noted above, fixed beacon signal/location map 101 may represent, for each respective point, location, sub-region, etc. within a given space (e.g., warehouse floor 100), wireless metrics associated with each such point, location, etc. In the examples discussed below, the wireless metrics are referred to as "signal strength" for the sake of example. In practice, similar concepts may apply for other wireless metrics such as Signal-to-Interference-and-Noise-Ratio ("SINR"), Received Signal Strength Indicator ("RSSI"), Reference Signal Received Power ("RSRP"), Reference Signal Received Quality ("RSRQ"), Channel Quality Indicator ("CQI"), and/or other metrics that indicate signal strength, signal quality, interference, etc.

Further, for the sake of brevity, the phrases "signal strength and/or other metrics relating to wireless signals broadcasted by" a given fixed beacon 203, "signal strength and/or other metrics relating to wireless signals transmitted by" a given fixed beacon 203, or the like, may be referred to as "signal strength associated with" such fixed beacon 203.

In graph 201 and the subsequent example graphs discussed below, "location" is represented in one dimension (e.g., as the X-axis for these graphs). In some implementations, "location" may refer to a single axis (e.g., a distance from a reference point). In other implementations, the illustrated "location" may represent a single dimension of a two-dimensional or three-dimensional position within a given space (e.g., warehouse floor 100) in which the fixed beacons are located. That is, graph 201 and other example graphs herein may be used to conceptually represent a two-dimensional or three-dimensional location, similar to how a flat image may depict a three-dimensional real-world object. Thus, for the sake of explanation, the "location," represented by the X-axis in graph 201 and subsequent graphs, may refer to one-dimensional, two-dimensional, or three-dimensional location information within a given space such as warehouse floor 100.

In graph 201, signal strengths associated with fixed beacons 203-1, 203-2, and 203-3 are plotted by location within a particular space. That is, for a given location within the space (e.g., a given two-dimensional or three-dimensional point or area), different respective signal strengths associated with each fixed beacon 203-1, 203-2, and 203-3 may be measured, observed, detected, etc. For example, during an initialization, calibration, etc. procedure, a device with a wireless receiver (e.g., a particular active tracker, a particular UE, and/or some other suitable device) may be used to measure wireless metrics such as signal strength from fixed beacons 203 within the particular space. Each fixed beacon 203 may, for example, wirelessly transmit (e.g., broadcast) information such as an identifier of each fixed beacon 203 (e.g., a hardware identifier, a Media Access Control ("MAC") address, a randomly generated number, etc.), based on which the identity of the particular fixed beacon 203 may be determined. In some embodiments, such identifiers of respective fixed beacons 203 may be unique, inasmuch no two fixed beacons 203 may transmit, broadcast, etc. the same identifier. In this manner, at any given point within the space, wireless signals from one or more fixed beacons 203 may be identified, along with the identity of each fixed beacon 203 from which a given wireless signal is detected, as well as signal strength (and/or other wireless metrics) associated with the wireless signals detected from each fixed beacon 203.

For example, at a given location within the space (e.g., as represented by point P along the X-axis of graph 201), a relatively high signal strength may be observed or measured with respect to fixed beacon 203-2 (e.g., a wireless signal may be received from fixed beacon 203-2 with a relatively high signal strength), a relatively moderate signal strength may be observed or measured with respect to fixed beacon 203-3, and a relatively low signal strength may be observed or measured with respect to fixed beacon 203-1. Thus, graph 201 may represent a "fingerprint" of the space in terms of wireless metrics (e.g., signal strength) associated with each fixed beacon 203 within the space. In some embodiments, the Y-axis of graph 201 and/or subsequent graphs may be normalized, such that different ranges or types of values may be more readily represented by such graphs. On the other hand, in some embodiments, the Y-axis of graph 201 and/or subsequent graphs may be provided in terms of absolute or actual values (e.g., actual signal strength measurement values).

Returning to FIG. 1, mobile beacons may be placed on, placed in, affixed to, integrated in, etc. objects such as pallets, boxes, vehicles (e.g., automated guided vehicles ("AGVs")), robots, IoT devices, or the like. In general, mobile beacons may be used to monitor, track, etc. the location of such objects (e.g., within a particular space that includes fixed beacons for which fixed beacon signal/location maps 101 have been generated, such as warehouse floor 100). As discussed above, mobile beacons may have relatively simple circuitry and/or logic, such as a wireless transmitter (e.g., that outputs wireless signals, such as wireless broadcasts that include a respective identifier of the mobile beacons).

Active trackers may, in accordance with some embodiments, have the capability to receive, detect, etc. wireless signals. For example, active trackers may have wireless receivers, radios, antennas, etc. that are capable of receiving wireless signals, such as wireless broadcasts from fixed beacons and active beacons. Active trackers may include, may be implemented by, may implement, and/or may be communicatively coupled to one or more UEs that have wireless network connectivity (e.g., connectivity to Internet Protocol ("IP") networks such as the Internet, to one or more wireless networks such as a Long-Term Evolution ("LTE") network or a Fifth Generation ("5G") network, etc.).

Active trackers may use such network connectivity to communicate with Mobile Beacon Localization System ("MBLS") 103, with each other, and/or with one or more other devices or systems. In some embodiments, MBLS 103 may be a network-accessible resource, such as an application server that is accessible via the Internet or some other network. In some embodiments, MBLS 103 may be implemented by an edge computing device of a wireless network, such as a Multi-Access/Mobile Edge Computing ("MEC") device. In some embodiments, one or more of the operations described herein with respect to MBLS 103 may be performed by one or more active trackers or other suitable devices.

Active trackers may each detect, receive, etc. short-range wireless signals (e.g., broadcasts) from one or more fixed beacons and/or mobile beacons on warehouse floor 100. Active trackers may identify the source of respective wireless signals (e.g., particular fixed beacons and/or mobile beacons), such as based on identifiers (e.g., hardware identifiers, MAC addresses, etc.) included in the wireless signals.

The active trackers may communicate with MBLS 103 to report detected short-range broadcasts as output by fixed beacons and mobile beacons. In accordance with some embodiments, and as described in more detail below, MBLS 103 may utilize fixed beacon signal/location maps 101 in conjunction with the information reported by one or more of the active trackers to determine the precise location (e.g., in two or three dimensions) of one or more of the mobile beacons on warehouse floor 100. As also described below, the use of "fingerprinting" techniques with respect to warehouse floor 100 based on fixed beacons (e.g., fixed beacon signal/location maps 101) may be leveraged to extend the precision and accuracy of such techniques to locations of mobile beacons on warehouse floor 100, without requiring the same initialization or calibration procedure for the mobile beacons, and further accounting for the mobile nature of mobile beacons (e.g., as opposed to the fixed beacons).

Figure 3:
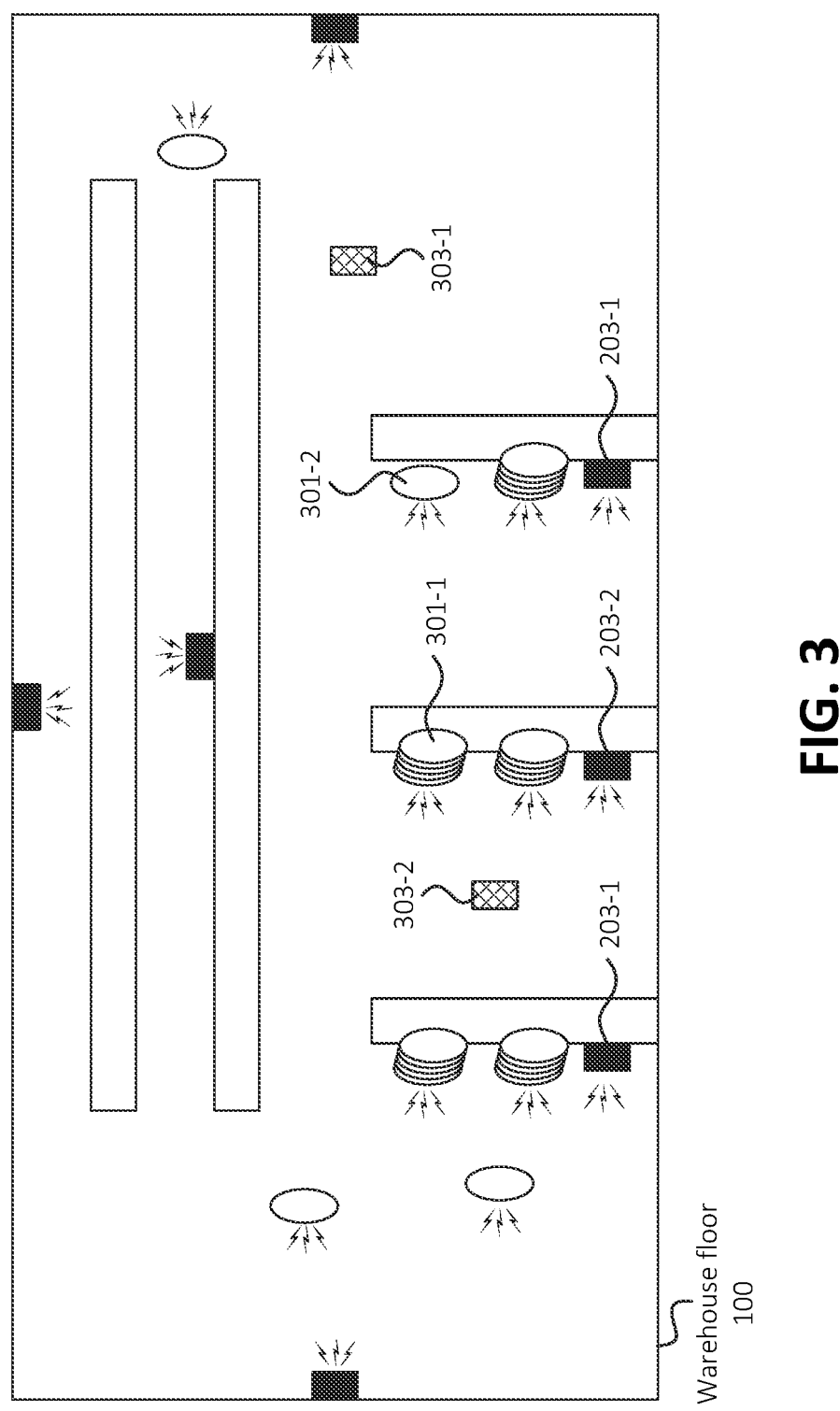
FIG. 3 identifies elements referred to in subsequent examples.

As shown in FIG. 3, examples described below relate to particular example fixed beacons 203-1, 203-2, and 203-3; mobile beacons 301-1 and 301-2; and active trackers 303-1 and 303-2, which may be located within a particular space (e.g., in a warehouse, room, facility, parking garage, etc.), such as warehouse floor 100. Fixed beacon signal/location maps 101, as discussed above, may have been generated for fixed beacons 203-1, 203-2, and 203-3, as noted above. Such fixed beacon signal/location maps 101 may, for example, represent a "fingerprint" of warehouse floor 100 based on a calibration, initialization, etc. procedure performed with respect to wireless signals transmitted by fixed beacons 203-1, 203-2, and 203-3.

Figure 4:
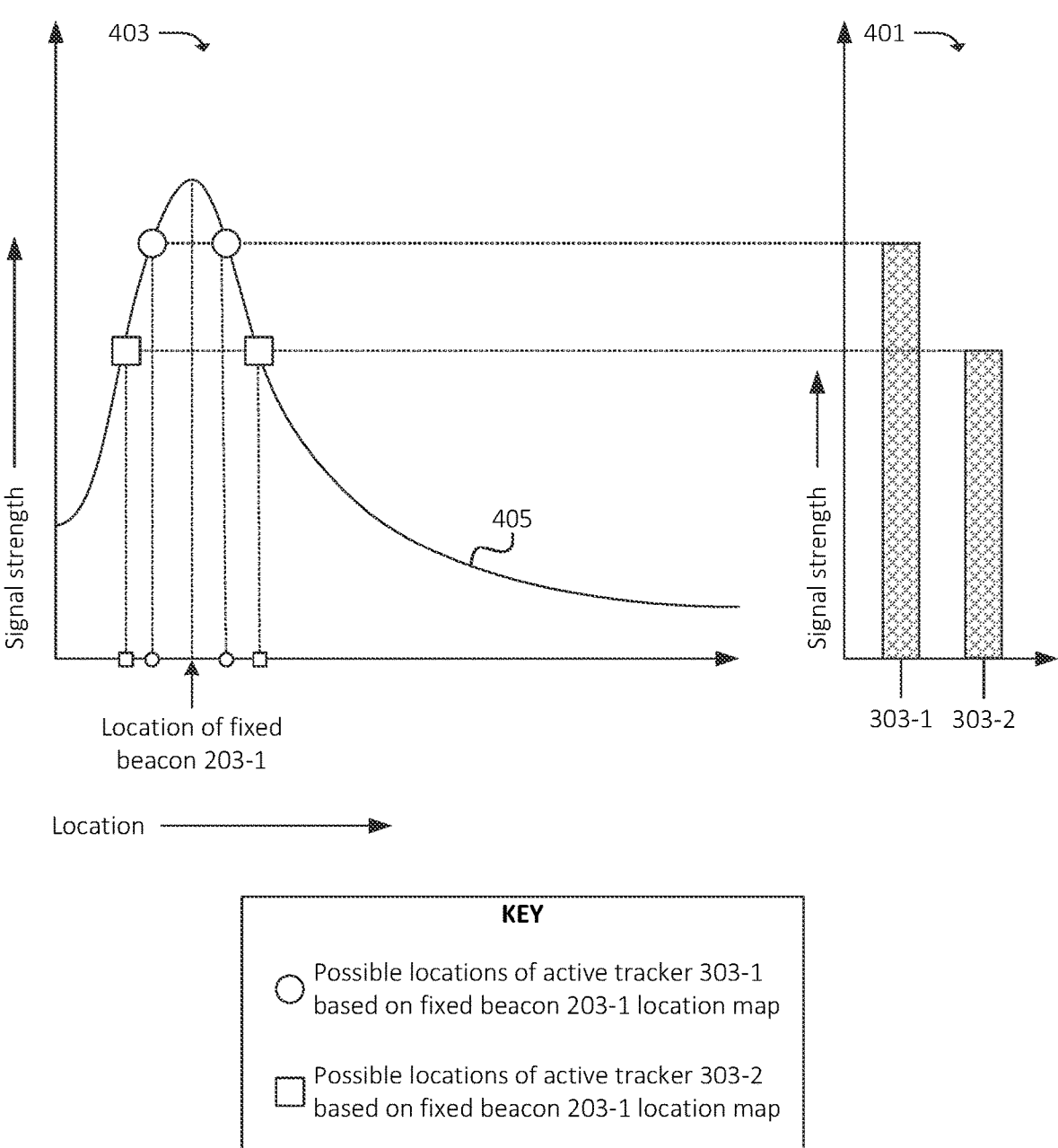
Figure 5:
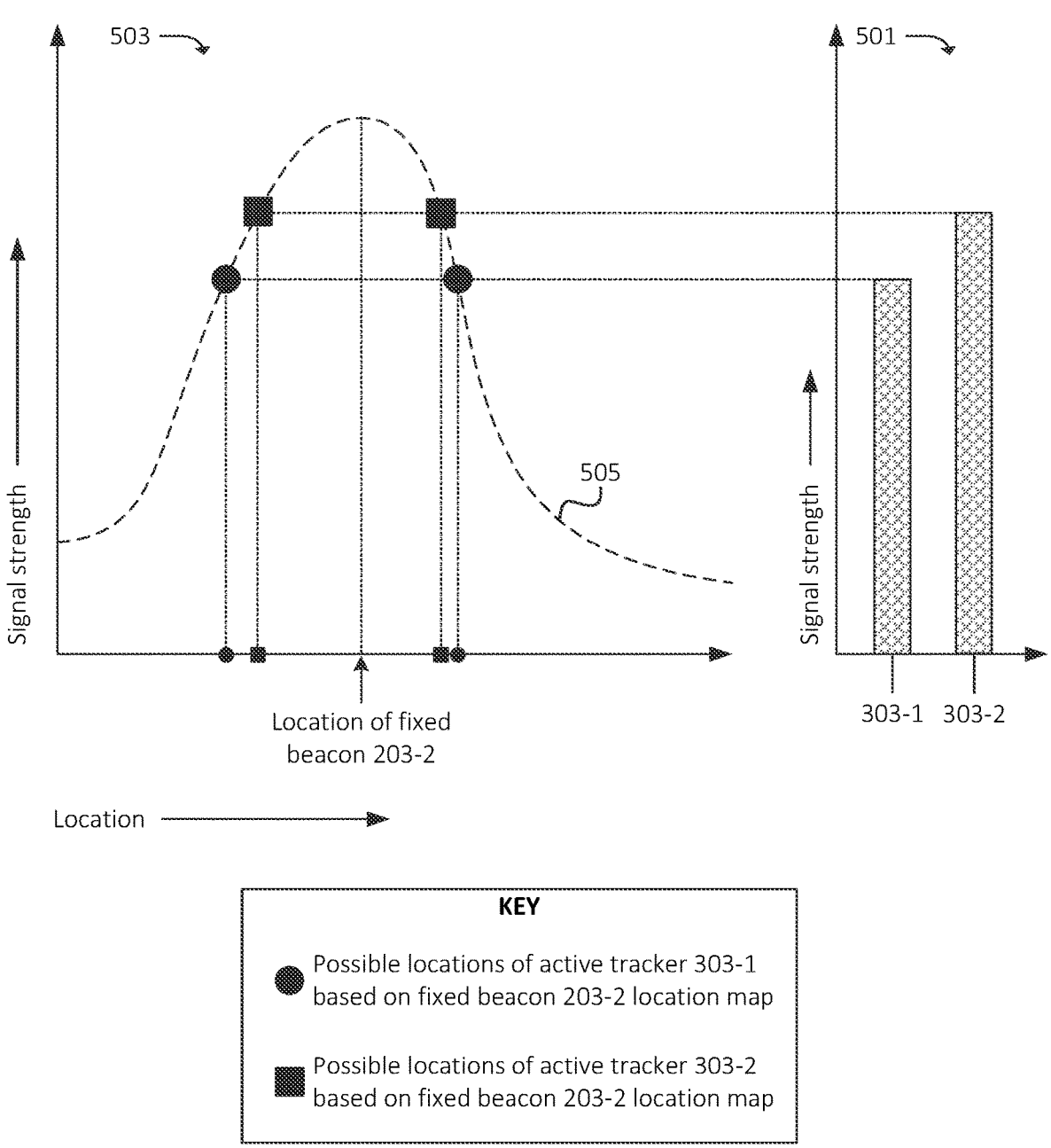

FIGS. 4-6 illustrates an example of how the locations of active trackers 303-1 and 303-2 may be determined based on respective fixed beacon signal/location maps 101 (e.g., fingerprints) for multiple fixed beacons 203 (e.g., fixed beacons 203-1 and 203-2). For example, MBLS 103 may monitor, receive, etc. information from one or more active trackers 303, indicating signal strengths or other wireless metrics associated with wireless signals that are transmitted (e.g., broadcasted) by one or more fixed beacons 203, as measured by respective active trackers 303.

As shown in FIG. 4, graph 401 may represent signal strengths associated with fixed beacon 203-1, as measured or otherwise determined by active trackers 303-1 and 303-2. For example, active tracker 303-1 may identify a relatively high signal strength with respect to fixed beacon 203-1 (e.g., signals broadcasted by fixed beacon 203-1 may be received by active tracker 303-1 with a relatively high measure of signal strength), while active tracker 303-2 may identify a relatively lower signal strength with respect to fixed beacon 203-1. These respective signal strengths, as measured by active trackers 303-1 and 303-2, may be a result of respective locations of active trackers 303-1 and 303-2 relative to fixed beacon 203-1, objects or room features that alter or affect wireless signals (e.g., walls, doors, windows, shelves, etc.), or other factors. As one example, active tracker 303-1 may be located relatively closer to fixed beacon 203-1, while active tracker 303-2 may be located farther away from fixed beacon 203-1.

Graph 403 represents an example fixed beacon signal/location map 101 for fixed beacon 203-1, within warehouse floor 100. Graph 403 may be considered a subset of graph 201, inasmuch as graph 201 represents fixed beacon signal/location maps 101 for fixed beacons 203-1 through 203-3, while graph 403 only represents the particular fixed beacon signal/location map 101 for fixed beacon 203-1. As shown, the location (or approximate location) of fixed beacon 203-1 within fixed beacon signal/location map 101 may correspond to the peak of curve 405 representing fixed beacon signal/location map 101 for fixed beacon 203. This may occur because the signal strength of wireless signals transmitted by fixed beacon 203-1 may be highest at or near the location of fixed beacon 203-1.

For the sake of explanation, curve 405 (and other curves discussed below) are referred to as "curves" that represent fixed beacon signal/location maps 101 associated with respective fixed beacons 203. In practice, other types of functions, shapes, lines, plots, etc. (e.g., which may be multi-dimensional) may represent fixed beacon signal/location maps 101 for one or more fixed beacons 203. Further, while curve 405 and other curves are each shown below as having one peak, these curves may have multiple peaks or valleys, where such peaks or valleys may result from radio interference, features or objects within a given space (e.g., machines, walls, shelves, etc.), or other factors.

As further shown, based on the signal strength and/or other metrics relating to wireless signals broadcasted by fixed beacon 203-1 and as measured by active trackers 303-1 and 303-2, possible locations within warehouse floor 100 may be identified for active trackers 303-1 and 303-2. For example, two possible locations may be identified for active tracker 303-1 (represented in the figure as white boxes), and two other possible locations may be identified for active tracker 303-2 (represented in the figure as white circles). Such locations for active tracker 303-1 may be "possible" locations inasmuch as the signal strength associated with fixed beacon 203-1, as measured by active tracker 303-1 (e.g., as shown in graph 401) matches the signal strengths on curve 405 (e.g., fixed beacon signal/location map 101 associated with fixed beacon 203-1) that were observed, measured, etc. at such locations when generating fixed beacon signal/location map 101 for fixed beacon 203-1 (e.g., as part of the initialization or calibration procedure mentioned above). Similarly, the possible locations for active tracker 303-2 may be based on the locations, on curve 405, that are associated with the signal strength that matches the signal strength associated with fixed beacon 203-1 as measured by active tracker 303-2 (e.g., as shown in graph 401). While examples are described herein in which two possible locations may be identified, in practice, greater or fewer than two possible locations may be identified. For example, in situations where a curve that represents a particular fixed beacon signal/location map 101 has multiple peaks or valleys, three or more possible locations for a given active tracker 303 may be identified.

FIG. 5 illustrates another example graph 501, which may include signal strengths associated with another fixed beacon within the same space (e.g., fixed beacon 203-2) as fixed beacon 203-1. These signal strengths may have also been measured by active trackers 303-1 and 303-2 at the same time (or within the same particular time window) as the measurements of signal strengths associated with fixed beacon 203-1, discussed above with respect to graph 401. In this example, active tracker 303-2 may have measured a higher signal strength associated with fixed beacon 203-2 than as measured by active tracker 303-1. For example, active tracker 303-2 may be relatively closer to fixed beacon 203-2, and active tracker 303-1 may be relatively farther from fixed beacon 203-2.

As similarly discussed above with respect to FIG. 4, graph 503 may represent fixed beacon signal/location map 101 for fixed beacon 203-2 (e.g., a fingerprint of warehouse floor 100 based on wireless signal metrics, such as signal strength, associated with fixed beacon 203-2). For example, curve 505 may represent different signal strengths, associated with fixed beacon 203-2, measured at different locations within warehouse floor 100 as part of an initialization or calibration procedure (e.g., a procedure by which fixed beacon signal/location map 101 is generated for fixed beacon 203-2). In a similar manner as discussed above with respect to FIG. 4, possible locations of active trackers 303-1 and 303-2 may be identified based on the signal strengths associated with fixed beacon 203-2, as measured by active trackers 303-1 and 303-2 (e.g., as shown in graph 501) and further based on curve 505.

FIG. 6 illustrates the identification of the actual locations of active trackers 303-1 and 303-2 based on the possible locations discussed above. That is, based on signal metrics associated with fixed beacons 203-1 and 203-2 as determined by active trackers 303-1 and 303-2 (e.g., at the same time or within the same time window), and further based on fixed beacon signal/location maps 101 for fixed beacons 203-1 and 203-2 (e.g., curves 405 and 505), MBLS 103 may identify the actual locations of active trackers 303-1 and 303-2. The actual location of a given active tracker 303 may correspond to a location where the possible locations for different active trackers 303, based on wireless metrics associated with fixed beacons 203-1 and 203-2, are the same (or are within a threshold distance of each other).

These examples show the locations of active trackers 303-1 and 303-2 being computed based on an exact match of possible locations based on signal strengths of two fixed beacons 203-1 and 203-2 as measured by active trackers 303-1 and 303-2. In practice, the locations of active trackers 303-1 and 303-2 may be computed based on beacon signal/location maps 101 associated with more than two fixed beacons 203. Further, when the possible locations of a given active tracker 303 based on beacon signal/location maps 101 of multiple fixed beacons 203 do not exactly match, a suitable similarity analysis between possible locations of active tracker 303 may be performed to identify a point or area at which such active tracker 303 is located. The similarity analysis may, in some embodiments, include operations such as outlier removal, data smoothing, noise reduction, likelihood evaluation, etc.

In accordance with some embodiments, the actual locations of active trackers 303 (e.g., active trackers 303-1 and 303-2) may further be used to identify actual locations of one or more mobile beacons 301 within the same space in which fixed beacons 203 and active trackers 303 are located. For example, as discussed below, one or more fingerprints of the particular space may be generated based on the actual locations of active trackers 303 as well as based on wireless metrics (e.g., signal strength) associated with mobile beacons 301, as measured by active trackers 303.

Figure 7:
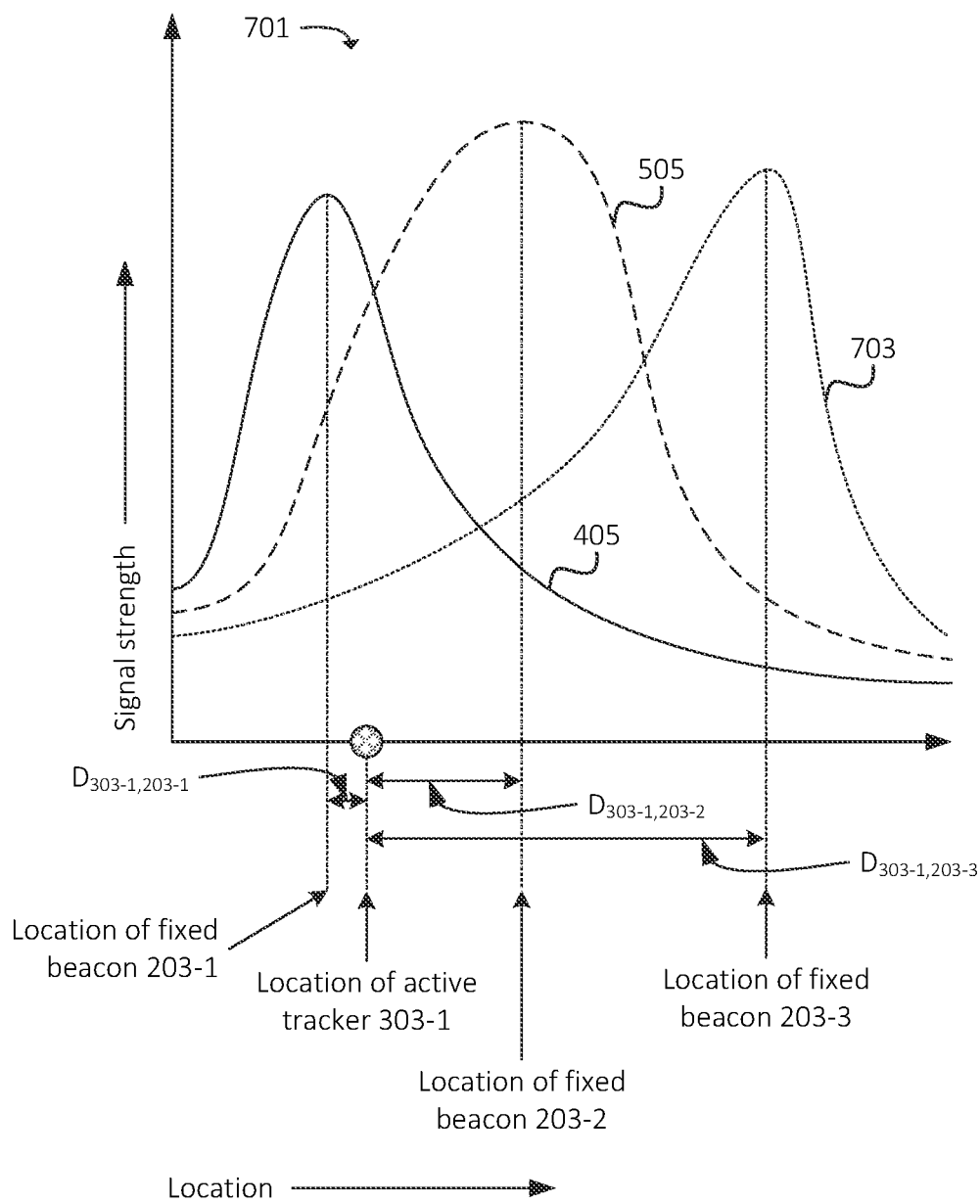

In some embodiments, generating the fingerprint for a given active tracker 303 may include computing a weighted average of fixed beacon signal/location maps 101, associated with fixed beacons 203 within warehouse floor 100. In some embodiments, the weighted average may be based on an actual or estimated distance of active tracker 303 from each fixed beacon 203, and/or based on other factors. For example, as shown in FIG. 7, graph 701 includes curves 405, 505, and 703, which represent fixed beacon signal/location maps 101 for fixed beacons 203-1, 203-2, and 203-3, respectively. The location of active tracker 303-1, as determined above, is also shown on graph 701. In accordance with some embodiments, the distance of active tracker 303 from a given fixed beacon 203 may be computed or estimated based on peaks (e.g., the highest signal strength values) of the respective curves included in graph 701. For example, the peak of curve 405 may be determined, estimated, assumed, etc. to be the location of fixed beacon 203-1, the peak of curve 505 may be determined, estimated, etc. to be the location of fixed beacon 203-2, and the peak of curve 703 may be determined, estimated, etc. to be the location of fixed beacon 203-3.

Thus, the distance between the location of active tracker 303-1 and the location (e.g., as determined, estimated, etc.) of fixed beacon 203-1 may be denoted as $D_{303\text{-}1,203\text{-}1}$. Similarly, the distance between the location of active tracker 303-1 and the location of fixed beacon 203-2 may be denoted as $D_{303\text{-}1,203\text{-}2}$, and the distance between the location of active tracker 303-1 and the location of fixed beacon 203-3 may be denoted as $D_{303\text{-}1,203\text{-}3}$. In this example, $D_{303\text{-}1,203\text{-}1}$ is the shortest distance, and $D_{303\text{-}1,203\text{-}3}$ is the longest distance.

FIG. 8 illustrates an example graph 801, which includes curves 405, 505, and 703, as well as weighed average curve 803. Weighted average curve 803 may reflect an average, a combination, etc. of curves 405, 505, and 703 (e.g., associated with fixed beacons 203-1, 203-2, and 203-3), further weighted based on the distances of active tracker 303-1 from fixed beacons 203-1, 203-2, and 203-3. Weighted average curve 803 may also be referred to as $W_{303\text{-}1}$, as weighted average curve 803 reflects or represents a fingerprint of warehouse floor 100 from the standpoint of active tracker 303-1. Weighted average curve 803 (e.g., $W_{303\text{-}1}$) may be plotted along the same X-axis as curves 405, 505, and 703. In this manner, weighted average curve 803 may represent signal strengths associated with active tracker 303-1 in the same space in which fixed beacons 203-1, 203-3, and 203-3 are located.

FIG. 9 illustrates graph 901, which further includes weighted average curve 903 that represents $W_{303\text{-}2}$ (e.g., a weighted average of curves 405, 505, and 703 from the standpoint of active tracker 303-2). In this manner, graph 901 may include a fingerprint (e.g., represented by weighted average curve 803) of the particular space from the standpoint of active tracker 303-1 (e.g., $W_{303\text{-}1}$) as well as a fingerprint (e.g., represented by weighted average curve 903) of the same particular space from the standpoint of active tracker 303-2. $W_{303\text{-}2}$ may have been generated using a similar procedure as discussed above with respect to $W_{303\text{-}1}$. While FIG. 9 illustrates two example weighted average curves 803 and 903 (e.g., associated with active trackers 303-1 and 303-2), in practice weighted average curves (e.g., fingerprints of the particular space) may be generated with respect to some or all active trackers 303 that are located within the particular space.

Figure 10:
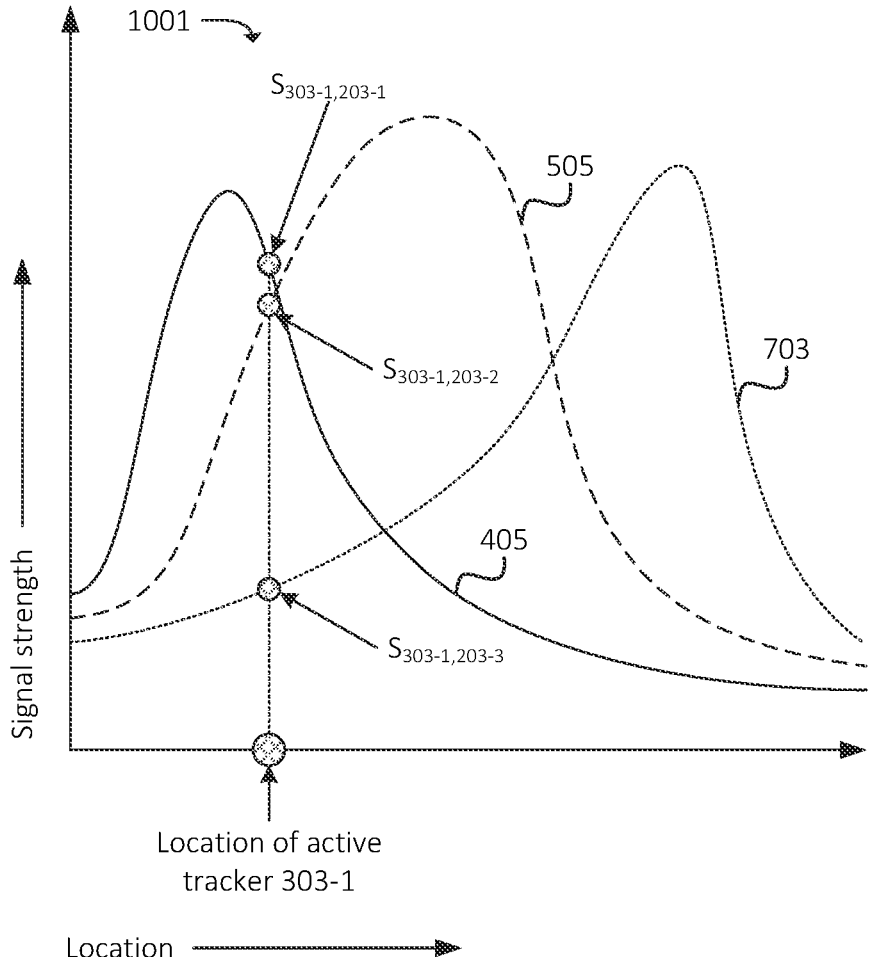

Furthermore, in some embodiments, weighted average curves may be generated using one or more other factors in addition to, or in lieu of, respective distances of active trackers 303 from particular fixed beacons 203. For example, as shown in graph 1001 of FIG. 10, signal strengths associated with different fixed beacons 203, as measured by a particular active tracker 303-1, may be identified and used when generating a weighted average curve for active tracker 303-1 (e.g., $W_{303\text{-}1}$). As shown, at the location of active tracker 303-1, a relatively high signal strength associated with fixed beacon 203-1 may be measured by active tracker 303-1 (denoted as $S_{303\text{-}1,203\text{-}1}$), a relatively lower signal strength associated with fixed beacon 203-2 may be measured by active tracker 303-1, and a relatively lower signal strength associated with fixed beacon 203-3 may be measured by active tracker 303-1. In some embodiments, the weighted average curve for active tracker 303-1 may reflect the relative signal strengths associated with fixed beacons 203-1, 203-2, and 203-3 as measured by active tracker 303-1. Similarly, some or all of the weighted average curves, associated with multiple active trackers 303, may be generated based on signal strengths of fixed beacons 203 as measured by active trackers 303, and/or based on other factors.

Figure 11:
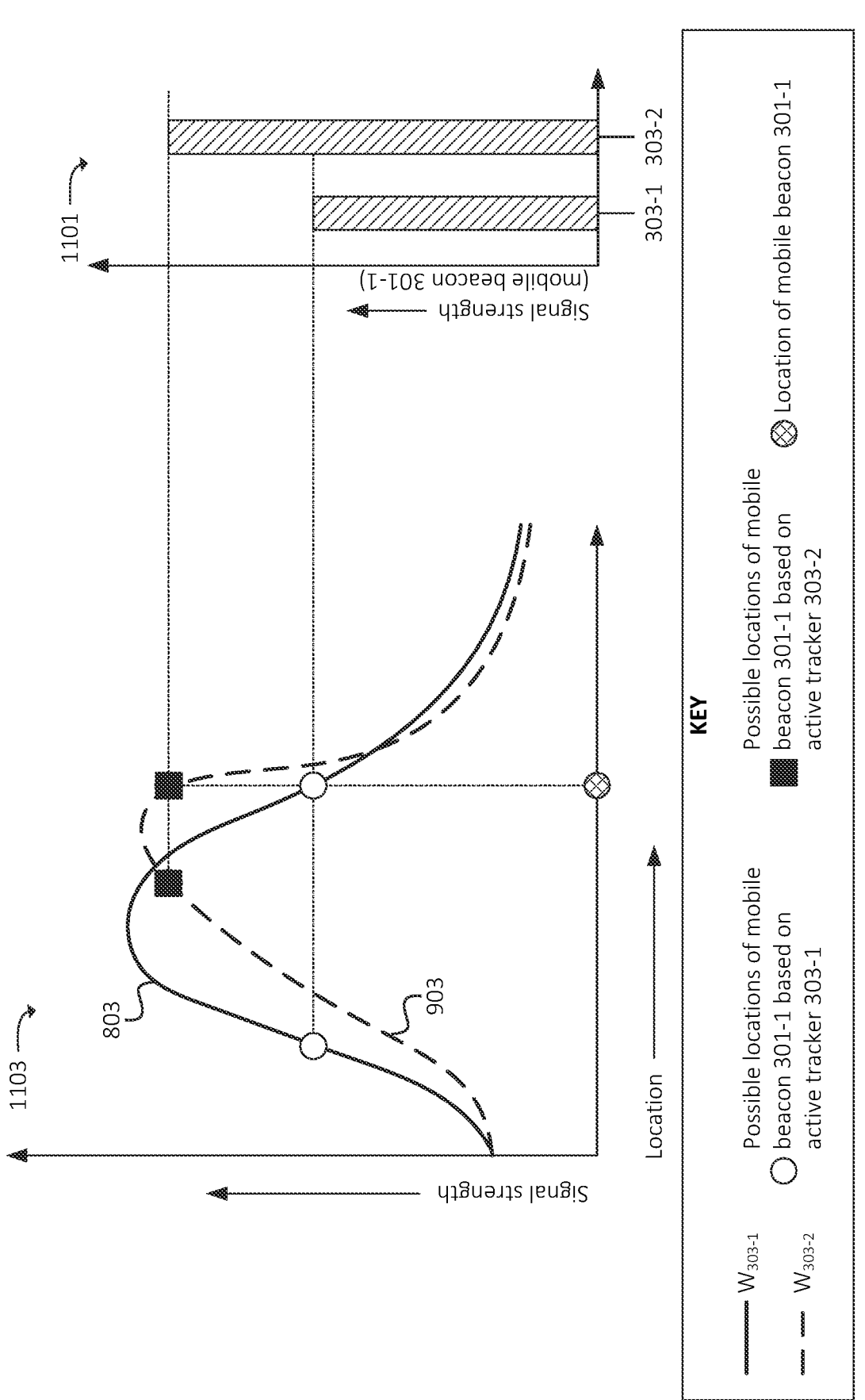
FIG. 11 illustrates an example of using the weighted averages of beacon signal/location maps to localize mobile beacons, in accordance with some embodiments.

As shown in FIG. 11, the weighted average curves associated with multiple active trackers 303 (e.g., weighted average curves 803 and 903, representing $W_{303-1}$ and $W_{303-2}$) may be used to identify the location of one or more mobile beacons 301 within the same particular space (e.g., warehouse floor 100, in which fixed beacons 203, mobile beacons 301, and active trackers 303 are located). Graph 1101 represents the signal strength associated with a particular mobile beacon 301-1, as measured by active trackers 303-1 and 303-2. As discussed above, mobile beacon 301-1 may broadcast wireless signals (e.g., on a periodic basis, on a continuous basis, etc.) that may be detected, received, etc. by active trackers 303. At a particular time, or within a particular time window, active trackers 303-1 and 303-2 may both detect the wireless signals broadcasted by mobile beacon 301-1. In this example, active tracker 303-1 may detect a relatively lower strength associated with mobile beacon 301-1, and active tracker 303-2 may detect a relatively higher signal strength associated with mobile beacon 301-1. This may occur because, for example, active tracker 303-1 is relatively farther away from mobile beacon 301-1, and active tracker 303-2 is relatively closer to mobile beacon 301-1. As discussed above, active trackers 303-1 and 303-2 may each report their respective measurements of signal strengths associated with mobile beacon 301-1 to MBLS 103 or some other suitable device or system.

Graph 1103 represents fingerprints of the particular space from the standpoint of multiple active trackers 303. As discussed above, weighted average curves 803 and 903 may represent the fingerprints of the particular space from the standpoint of multiple active trackers 303, such as active trackers 303-1 and 303-2. Possible locations of mobile beacon 301-1 may be determined within the particular space based on comparing the measured signal strength associated with mobile beacon 301-1, as measured by active trackers 303-1 and 303-2 and as shown in graph 1101, to weighted average curves 803 and 903 associated with active trackers 303-1 and 303-2 as shown in graph 1103. The possible locations of mobile beacon 301-1 may be determined based on locations that correspond to signal strengths that match (e.g., an exact match or a match determined based on measure of similarity beyond a suitable similarity threshold) between respective signal strengths measured by active trackers 303, and weighted average curves 803 and 903. In some embodiments, the Y-axes of graphs 1101 and 1103 may represent preprocessed signals (e.g., signal strengths). For example, the preprocessed signals could be the differences between the signal strengths, or could be the signal strength bias relative to a path loss model.

In some embodiments, the Y-axes (e.g., signal strengths) of graphs 1101 and 1103 may be normalized. For example, signal strengths associated with fixed beacons 203 as measured by active trackers 303 (on which weighted average curves for such fixed beacons 203 may ultimately be based), may be on a first scale or a first range of values. On the other hand, signal strengths associated with mobile beacons 301 as measured by active trackers 303 (e.g., as reflected in graph 1101), may be on a second scale or a second range of values. Such differences may occur based on, for example, different parameters or configurations of wireless transmitters associated with fixed beacons 203 and mobile beacons

301. Normalizing these values may facilitate the comparison of signal strengths associated with mobile beacons 301 and as measured by active trackers 303 (e.g., graph 1101) with weighted average curves associated with such active trackers 303 (e.g., weighted average curves 803 and 903).

In graph 1103, a first set of possible locations of mobile beacon 301-1 may be determined based on weighted average curve 803, which represents the fingerprint of the particular space from the standpoint of active tracker 303-1. The first set of possible locations of mobile beacon 301-1 are denoted by white circles placed along weighted average curve 803. A second set of possible locations of mobile beacon 301-1 may further be determined based on weighted average curve 903, which represents the fingerprint of the particular space from the standpoint of active tracker 303-2. The second set of possible locations of mobile beacon 301-1 are denoted by black squares placed along weighted average curve 903. As shown, the signal strengths associated with mobile beacon 301-1, as measured by active trackers 303-1 and 303-2, may match the fingerprints associated with active trackers 303-1 and 303-2 (e.g., weighted average curves 803 and 903) at the same, or approximately, the same location (denoted in the figure with the crosshatched circle). This location may be determined as the location of mobile beacon 301-1.

Since weighted average curve 803 represents signal strengths as measured by active tracker 303-1 throughout the particular space, signal strengths of wireless signals as measured by active tracker 303-1 may be indicative of possible locations of devices (e.g., mobile beacons 301) that transmit such wireless signals. Similarly, weighted average curve 903 represents signal strengths as measured by active tracker 303-2 throughout the same particular space, signal strengths of wireless signals as measured by active tracker 303-2 may be indicative of possible locations of devices that transmit such wireless signals. As noted above, matching possible locations for a given mobile beacon 301, determined as discussed above, may be determined as the actual location of such mobile beacon 301. As similarly discussed above, situations may arise in which possible locations of a given mobile beacon 301, on weighted average curves 803 and 903, do not exactly match. In such situations, the possible locations that most closely match, and/or that match beyond a suitable threshold of similarity, may be determined as the location of mobile beacon 301. In some embodiments, the location of mobile beacon 301 may be determined as a particular point within the particular space, and/or a region or area within particular space. In some embodiments, the location (e.g., region or area) at which mobile beacon 301 is located may be indicated as a probability density function (e.g., indicating including a measure of likelihood or probability that the mobile beacon 301 is located at one or more given locations, areas, etc.). In some embodiments, the size or shape of such region or area may vary with the variance between the corresponding possible locations of mobile beacon 301. For example, if the possible locations of mobile beacon 301 are relatively far apart, the location of mobile beacon 301 may be indicated as a relatively large area within the particular space (e.g., the location of mobile beacon 301 may be determined within a range of several meters), while if the possible locations of mobile beacon 301 are relatively close to each other, mobile beacon 301 may be more precisely localized (e.g., a range of less than one meter).

FIG. 11 is described in terms of identifying the location within a particular space of one mobile beacon 301-1 based on fingerprints of the particular space from the standpoint of two active trackers 303-1 and 303-2. In practice, fingerprints associated with more than two active trackers 303 may be used. Additionally, similar operations may be performed to identify the locations of any quantity of mobile beacons 301 within the given space at any given time. In this manner, a relatively large quantity of low-complexity radio signal-emitting devices, such as mobile beacons 301, may be able to be monitored, tracked, etc. with a relatively high degree of precision (e.g., based on fingerprinting techniques) and with the use of a relatively small quantity of devices with more advanced capabilities (e.g., devices with radio signal transmitting and receiving capabilities, processing and/or computing capabilities, etc.), such as active trackers 303. Further, since MBLS 103 may be deployed as a network-accessible resource, remote devices, facilities, operators, etc. may be able to track, monitor, etc. the locations of mobile beacons 301 within numerous, geographically diverse spaces such as buildings, factories, warehouses, etc. across different cities, states, provinces, etc.

The location of a mobile beacon, that is determined based on measurements in a certain time period from the active trackers, as discussed above, may be the input to a filter. Then, the next location, based on the measurements in the next time period, may be the input to the filter, and so on. The filter may, after every time period, output a filtered location estimate of the mobile beacon. The filter may not only improve the location accuracy but also make it possible to determine the location of a mobile beacon with just a single active tracker 303. Further, such techniques may aid in localization of mobile beacon 301 when mobile beacon 301 is stationary (e.g., mounted on a pallet on a shelf) and active tracker 303 is moving around within the given space.

FIG. 12 illustrates an example process 1200 for localizing one or more mobile beacons within a particular space using wireless fingerprinting techniques. In some embodiments, some or all of process 1200 may be performed by MBLS 103.

As shown, process 1200 may include determining (at 1202), based on wireless signals associated with a first set of devices, a first reference map associated with a particular space. The first set of devices may include, for example, fixed beacons 203 that are located in the particular space. The first reference map may have been generated as part of an initialization or calibration procedure, as discussed above. In some embodiments, the first set of devices may include devices with wireless signal transmitting capability (e.g., one or more wireless transmitters). In some embodiments, the first set of devices may include devices that do not have wireless signal receiving capability (e.g., one or more wireless receivers). Additionally, or alternatively, the first set of devices may include devices that are not configured to transmit wireless signals, or which otherwise do not transmit wireless signals.

The first reference map may include, for example, wireless metrics associated with each device of the first set of devices (e.g., with each fixed beacon 203). The first reference map may, for example, associate particular locations within the particular space as being associated with particular wireless metrics (e.g., signal strength) of wireless signals transmitted by each device of the first set of devices, as discussed above. An example of the first reference map is represented in FIG. 2 as graph 201.

Process 1200 may further include determining (at 1204), based on the first reference map and further based on wireless metrics associated with first set of devices as measured by second set of devices, a second reference map associated with the particular space. In some embodiments, the second set of devices may include devices with the capability to receive, detect, measure, etc. wireless signals, such as wireless signals transmitted by the first set of devices and/or other devices. For example, the second set of devices may include active trackers 303 which may include one or more wireless receivers. In some embodiments, some or all of the second set of devices may also include additional wireless circuitry and/or logic, such as one or more wireless transmitters, radios, or the like. Active trackers 303 may use such transmitters or other suitable techniques to relay, output, etc. the wireless metrics to MBLS 103. MBLS 103 may receive such wireless metrics on a period or otherwise ongoing basis from active trackers 303 which are located in the same particular space as fixed beacons 203 and/or other devices, such as mobile beacons 301.

As discussed above, a particular active tracker 303 may measure wireless metrics (e.g., signal strength or other suitable metrics) of wireless signals transmitted by one or more fixed beacons 203. Features such as distance from a given fixed beacon 203, environmental features, localized radio interference, etc., may impact the wireless metrics associated with wireless signals transmitted by such fixed beacon 203, as measured by active tracker 303. As also discussed above, weighted averages associated with the first reference map (e.g., a weighted average of curves that each represent location-based wireless signal metrics associated with fixed beacons 203) may be generated for each active tracker 303. As discussed above, such weighted averages may be weighted based on factors such as distance of a given active tracker 303 from one or more fixed beacons 203, signal strength associated with one or more fixed beacons 203 as measured by active tracker 303, and/or other factors. The second reference map may include or may be based on the weighted averages, such that the second reference map represents a fingerprint of the particular space from the standpoint of the second set of devices (e.g., active trackers 303 that have measured wireless metrics of wireless signals transmitted by fixed beacons 203).

Process 1200 may additionally include determining (at 1206), based on the second reference map and further based on wireless metrics associated with a third set of devices as measured by second set of devices, locations within particular space of the third set of devices. The third set of devices may include devices with wireless transmission capability, such as mobile beacons 301. In some embodiments, mobile beacons 301 may be devices for which a reference map has not been generated (e.g., in contrast with fixed beacons 203, for which a reference map has been generated). Due to the mobile nature of mobile beacons 301, it may be unfeasible to generate a reference map for mobile beacons 301 using an initialization or calibration procedure that may otherwise be used to generate such reference map for fixed beacons 203. In some embodiments, mobile beacons 301 may be devices that do not include location determination capability, that do not include wireless signal reception capability (e.g., do not include a wireless receiver), that do not have network connectivity (e.g., the ability to communicate with MBLS 103), and/or that otherwise do not receive wireless signals from active trackers 303 and/or fixed beacons 203.

As discussed above (e.g., with respect to FIG. 11), MBLS 103 may receive information (e.g., from active trackers 303) indicating wireless metrics of wireless signals transmitted (e.g., broadcasted) by mobile beacons 301, as measured or received by active trackers 303. For a given mobile beacon 301, MBLS 103 may identify the wireless metrics of signals transmitted by mobile beacon 301 and as received by one or more active trackers 303. MBLS 103 may identify possible locations and/or the location of mobile beacon 301 based on the second reference map (e.g., which represents a fingerprint of the particular space from the standpoint of the one or more active trackers 303). In this manner, MBLS 103 may determine, monitor, etc. the locations of numerous mobile beacons 301 within the particular space in real time or near-real time.

Process 1200 may also include outputting (at 1208) information indicating the locations of the third set of devices (e.g., within the particular space). For example, MBLS 103 may output the location information to another device (e.g., an administrator console, a location monitoring or reporting system, etc.), either in response to requests for such information or as a periodic or otherwise ongoing series of "push" communications. In some embodiments, MBLS 103 may further perform one or more operations based on the determined locations of mobile beacons 301, such as outputting alerts when mobile beacons 301 are located outside of a particular boundary, controlling AGVs on which particular mobile beacons 301 are affixed (e.g., to avoid collisions between such AGVs or other objects), and/or other suitable operations.

Figure 13:
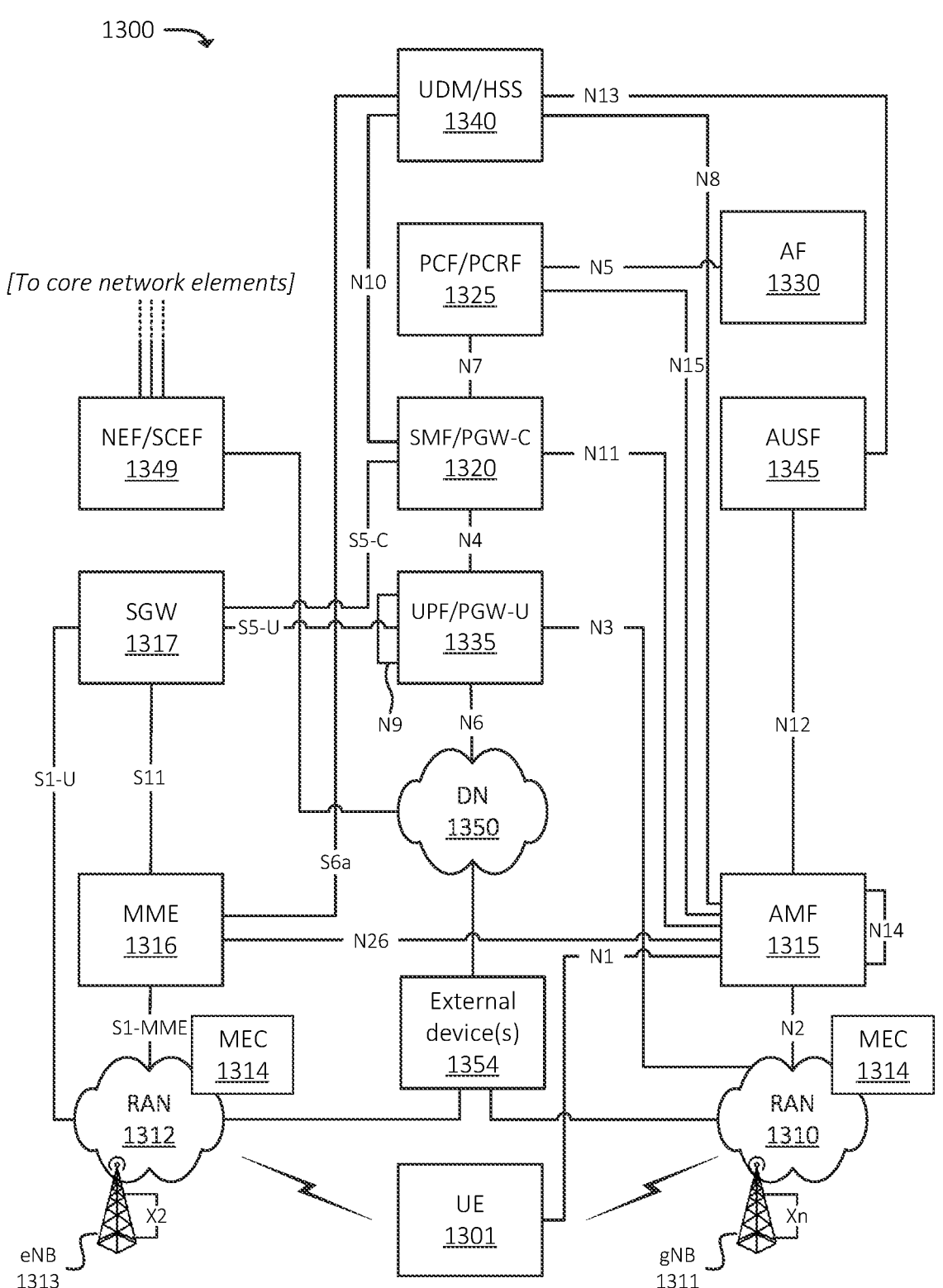
FIG. 13 illustrates an example environment in which one or more embodiments, described herein, may be implemented.

FIG. 13 illustrates an example environment 1300, in which one or more embodiments may be implemented. In some embodiments, environment 1300 may correspond to a 5G network, and/or may include elements of a 5G network. In some embodiments, environment 1300 may correspond to a 5G Non-Standalone ("NSA") architecture, in which a 5G radio access technology ("RAT") may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). In some embodiments, portions of environment 1300 may represent or may include a 5G core ("5GC"). As shown, environment 1300 may include UE 1301, radio access network ("RAN") 1310 (which may include one or more Next Generation Node Bs ("gNBs") 1311), RAN 1312 (which may include one or more evolved Node Bs ("eNBs") 1313), and various network functions such as Access and Mobility Management Function ("AMF") 1315, Mobility Management Entity ("MME") 1316, Serving Gateway ("SGW") 1317, Session Management Function ("SMF")/Packet Data Network ("PDN") Gateway ("PGW")-Control plane function ("PGW-C") 1320, Policy Control Function ("PCF")/Policy Charging and Rules Function ("PCRF") 1325, Application Function ("AF") 1330, User Plane Function ("UPF")/PGW-User plane function ("PGW-U") 1335, Unified Data Management ("UDM")/Home Subscriber Server ("HSS") 1340, Authentication Server Function ("AUSF") 1345, and Network Exposure Function ("NEF")/Service Capability Exposure Function ("SCEF") 1349. Environment 1300 may also include one or more networks, such as Data Network ("DN") 1350. Environment 1300 may include one or more additional devices or systems communicatively coupled to one or more networks (e.g., DN 1350), such as one or more external devices 1354.

The example shown in FIG. 13 illustrates one instance of each network component or function (e.g., one instance of SMF/PGW-C 1320, PCF/PCRF 1325, UPF/PGW-U 1335, UDM/HSS 1340, and/or AUSF 1345). In practice, environment 1300 may include multiple instances of such components or functions. For example, in some embodiments, environment 1300 may include multiple "slices" of a core network, where each slice includes a discrete and/or logical set of network functions (e.g., one slice may include a first instance of AMF 1315, SMF/PGW-C 1320, PCF/PCRF 1325, and/or UPF/PGW-U 1335, while another slice may include a second instance of AMF 1315, SMF/PGW-C 1320, PCF/PCRF 1325, and/or UPF/PGW-U 1335). The different slices may provide differentiated levels of service, such as service in accordance with different Quality of Service ("QoS") parameters.

The quantity of devices and/or networks, illustrated in FIG. 13, is provided for explanatory purposes only. In practice, environment 1300 may include additional devices and/or networks, fewer devices and/or networks, different devices and/or networks, or differently arranged devices and/or networks than illustrated in FIG. 13. For example, while not shown, environment 1300 may include devices that facilitate or enable communication between various components shown in environment 1300, such as routers, modems, gateways, switches, hubs, etc. In some implementations, one or more devices of environment 1300 may be physically integrated in, and/or may be physically attached to, one or more other devices of environment 1300. Alternatively, or additionally, one or more of the devices of environment 1300 may perform one or more network functions described as being performed by another one or more of the devices of environment 1300.

Additionally, one or more elements of environment 1300 may be implemented in a virtualized and/or containerized manner. For example, one or more of the elements of environment 1300 may be implemented by one or more Virtualized Network Functions ("VNFs"), Cloud-Native Network Functions ("CNFs"), etc. In such embodiments, environment 1300 may include, may implement, and/or may be communicatively coupled to an orchestration platform that provisions hardware resources, installs containers or applications, performs load balancing, and/or otherwise manages the deployment of such elements of environment 1300. In some embodiments, such orchestration and/or management of such elements of environment 1300 may be performed by, or in conjunction with, the open-source Kubernetes® application programming interface ("API") or some other suitable virtualization, containerization, and/or orchestration system.

Elements of environment 1300 may interconnect with each other and/or other devices via wired connections, wireless connections, or a combination of wired and wireless connections. Examples of interfaces or communication pathways between the elements of environment 1300, as shown in FIG. 13, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 13, such as Service-Based Interfaces ("SBIs"), including an Namf interface, an Nudm interface, an Npcf interface, an Nupf interface, an Nnef interface, an Nsmf interface, and/or one or more other SBIs.

UE 1301 may include a computation and communication device, such as a wireless mobile communication device that is capable of communicating with RAN 1310, RAN 1312, and/or DN 1350. UE 1301 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a programmable logic controller or other industrial controller, a Machine-to-Machine ("M2M") device, or the like), a Fixed Wireless Access ("FWA") device, or another type of mobile computation and communication device. UE 1301 may send traffic to and/or receive traffic (e.g., user plane traffic) from DN 1350 via RAN 1310, RAN 1312, and/or UPF/PGW-U 1335. As discussed above, in some embodiments, UE 1301 may include, may implement, may be implemented by, and/or may be communicatively coupled to one or more active trackers 303.

RAN 1310 may be, or may include, a 5G RAN that implements a 5G RAT and that includes one or more base stations (e.g., one or more gNBs 1311), via which UE 1301 may communicate with one or more other elements of environment 1300. UE 1301 may communicate with RAN 1310 via an air interface (e.g., as provided by gNB 1311). For instance, RAN 1310 may receive traffic (e.g., user plane traffic such as voice call traffic, data traffic, messaging traffic, etc.) from UE 1301 via the air interface, and may communicate the traffic to UPF/PGW-U 1335 and/or one or more other devices or networks. Further, RAN 1310 may receive signaling traffic, control plane traffic, etc. from UE 1301 via the air interface, and may communicate such signaling traffic, control plane traffic, etc. to AMF 1315 and/or one or more other devices or networks. Additionally, RAN 1310 may receive traffic intended for UE 1301 (e.g., from UPF/PGW-U 1335, AMF 1315, and/or one or more other devices or networks) and may communicate the traffic to UE 1301 via the air interface.

RAN 1312 may be, or may include, an LTE RAN that implements an LTE RAT and that includes one or more base stations (e.g., one or more eNBs 1313), via which UE 1301 may communicate with one or more other elements of environment 1300. UE 1301 may communicate with RAN 1312 via an air interface (e.g., as provided by eNB 1313). For instance, RAN 1312 may receive traffic (e.g., user plane traffic such as voice call traffic, data traffic, messaging traffic, signaling traffic, etc.) from UE 1301 via the air interface, and may communicate the traffic to UPF/PGW-U 1335 (e.g., via SGW 1317) and/or one or more other devices or networks. Further, RAN 1312 may receive signaling traffic, control plane traffic, etc. from UE 1301 via the air interface, and may communicate such signaling traffic, control plane traffic, etc. to MME 1316 and/or one or more other devices or networks. Additionally, RAN 1312 may receive traffic intended for UE 1301 (e.g., from UPF/PGW-U 1335, MME 1316, SGW 1317, and/or one or more other devices or networks) and may communicate the traffic to UE 1301 via the air interface.

One or more RANs of environment 1300 (e.g., RAN 1310 and/or RAN 1312) may include, may implement, and/or may otherwise be communicatively coupled to one or more edge computing devices, such as one or more Multi-Access/Mobile Edge Computing ("MEC") devices (referred to sometimes herein simply as a "MECs") 1314. MECs 1314 may be co-located with wireless network infrastructure equipment of RANs 1310 and/or 1312 (e.g., one or more gNBs 1311 and/or one or more eNBs 1313, respectively). Additionally, or alternatively, MECs 1314 may otherwise be associated with geographical regions (e.g., coverage areas) of wireless network infrastructure equipment of RANs 1310 and/or 1312. In some embodiments, one or more MECs 1314 may be implemented by the same set of hardware resources, the same set of devices, etc. that implement wireless network infrastructure equipment of RANs 1310 and/or 1312. In some embodiments, one or more MECs 1314 may be implemented by different hardware resources, a different set of devices, etc. from hardware resources or devices that implement wireless network infrastructure equipment of RANs 1310 and/or 1312. In some embodiments, MECs 1314 may be communicatively coupled to wireless network infrastructure equipment of RANs 1310 and/or 1312 (e.g., via a high-speed and/or low-latency link such as a physical wired interface, a high-speed and/or low-latency wireless interface, or some other suitable communication pathway).

MECs 1314 may include hardware resources (e.g., configurable or provisionable hardware resources) that may be configured to provide services and/or otherwise process traffic to and/or from UE 1301, via RAN 1310 and/or 1312. For example, RAN 1310 and/or 1312 may route some traffic from UE 1301 (e.g., traffic associated with one or more particular services, applications, application types, etc.) to a respective MEC 1314 instead of to core network elements of 1300 (e.g., UPF/PGW-U 1335). MEC 1314 may accordingly provide services to UE 1301 by processing such traffic, performing one or more computations based on the received traffic, and providing traffic to UE 1301 via RAN 1310 and/or 1312. MEC 1314 may include, and/or may implement, some or all of the functionality described above with respect to MBLS 103, UPF/PGW-U 1335, AF 1330, one or more application servers, and/or one or more other devices, systems, VNFs, CNFs, etc. In this manner, ultra-low latency services may be provided to UE 1301, as traffic does not need to traverse links (e.g., backhaul links) between RAN 1310 and/or 1312 and the core network.

AMF 1315 may include one or more devices, systems, VNFs, CNFs, etc., that perform operations to register UE 1301 with the 5G network, to establish bearer channels associated with a session with UE 1301, to hand off UE 1301 from the 5G network to another network, to hand off UE 1301 from the other network to the 5G network, manage mobility of UE 1301 between RANs 1310 and/or gNBs 1311, and/or to perform other operations. In some embodiments, the 5G network may include multiple AMFs 1315, which communicate with each other via the N14 interface (denoted in FIG. 13 by the line marked "N14" originating and terminating at AMF 1315).

MME 1316 may include one or more devices, systems, VNFs, CNFs, etc., that perform operations to register UE 1301 with the EPC, to establish bearer channels associated with a session with UE 1301, to hand off UE 1301 from the EPC to another network, to hand off UE 1301 from another network to the EPC, manage mobility of UE 1301 between RANs 1312 and/or eNBs 1313, and/or to perform other operations.

SGW 1317 may include one or more devices, systems, VNFs, CNFs, etc., that aggregate traffic received from one or more eNBs 1313 and send the aggregated traffic to an external network or device via UPF/PGW-U 1335. Additionally, SGW 1317 may aggregate traffic received from one or more UPF/PGW-Us 1335 and may send the aggregated traffic to one or more eNBs 1313. SGW 1317 may operate as an anchor for the user plane during inter-eNB handovers and as an anchor for mobility between different telecommunication networks or RANs (e.g., RANs 1310 and 1312).

SMF/PGW-C 1320 may include one or more devices, systems, VNFs, CNFs, etc., that gather, process, store, and/or provide information in a manner described herein. SMF/PGW-C 1320 may, for example, facilitate the establishment of communication sessions on behalf of UE 1301.

In some embodiments, the establishment of communications sessions may be performed in accordance with one or more policies provided by PCF/PCRF 1325.

PCF/PCRF 1325 may include one or more devices, systems, VNFs, CNFs, etc., that aggregate information to and from the 5G network and/or other sources. PCF/PCRF 1325 may receive information regarding policies and/or subscriptions from one or more sources, such as subscriber databases and/or from one or more users (such as, for example, an administrator associated with PCF/PCRF 1325).

AF 1330 may include one or more devices, systems, VNFs, CNFs, etc., that receive, store, and/or provide information that may be used in determining parameters (e.g., quality of service parameters, charging parameters, or the like) for certain applications.

UPF/PGW-U 1335 may include one or more devices, systems, VNFs, CNFs, etc., that receive, store, and/or provide data (e.g., user plane data). For example, UPF/PGW-U 1335 may receive user plane data (e.g., voice call traffic, data traffic, etc.), destined for UE 1301, from DN 1350, and may forward the user plane data toward UE 1301 (e.g., via RAN 1310, SMF/PGW-C 1320, and/or one or more other devices). In some embodiments, multiple instances of UPF/PGW-U 1335 may be deployed (e.g., in different geographical locations), and the delivery of content to UE 1301 may be coordinated via the N9 interface (e.g., as denoted in FIG. 13 by the line marked "N9" originating and terminating at UPF/PGW-U 1335). Similarly, UPF/PGW-U 1335 may receive traffic from UE 1301 (e.g., via RAN 1310, RAN 1312, SMF/PGW-C 1320, and/or one or more other devices), and may forward the traffic toward DN 1350. In some embodiments, UPF/PGW-U 1335 may communicate (e.g., via the N4 interface) with SMF/PGW-C 1320, regarding user plane data processed by UPF/PGW-U 1335.

UDM/HSS 1340 and AUSF 1345 may include one or more devices, systems, VNFs, CNFs, etc., that manage, update, and/or store, in one or more memory devices associated with AUSF 1345 and/or UDM/HSS 1340, profile information associated with a subscriber. In some embodiments, UDM/HSS 1340 may include, may implement, may be communicatively coupled to, and/or may otherwise be associated with some other type of repository or database, such as a Unified Data Repository ("UDR"). AUSF 1345 and/or UDM/HSS 1340 may perform authentication, authorization, and/or accounting operations associated with one or more UEs 1301 and/or one or more communication sessions associated with one or more UEs 1301.

DN 1350 may include one or more wired and/or wireless networks. For example, DN 1350 may include an Internet Protocol ("IP")-based PDN, a wide area network ("WAN") such as the Internet, a private enterprise network, and/or one or more other networks. UE 1301 may communicate, through DN 1350, with data servers, other UEs 1301, and/or to other servers or applications that are coupled to DN 1350. DN 1350 may be connected to one or more other networks, such as a public switched telephone network ("PSTN"), a public land mobile network ("PLMN"), and/or another network. DN 1350 may be connected to one or more devices, such as content providers, applications, web servers, and/or other devices, with which UE 1301 may communicate.

External devices 1354 may include one or more devices or systems that communicate with UE 1301 via DN 1350 and one or more elements of 1300 (e.g., via UPF/PGW-U 1335). In some embodiments, external devices 1354 may include, may implement, and/or may otherwise be associated with MBLS 103. External devices 1354 may include, for example, one or more application servers, content provider systems, web servers, or the like. External devices 1354 may, for example, implement "server-side" applications that communicate with "client-side" applications executed by UE 1301. External devices 1354 may provide services to UE 1301 such as gaming services, videoconferencing services, messaging services, email services, web services, and/or other types of services.

In some embodiments, external devices 1354 may communicate with one or more elements of environment 1300 (e.g., core network elements) via NEF/SCEF 1349. NEF/SCEF 1349 include one or more devices, systems, VNFs, CNFs, etc. that provide access to information, APIs, and/or other operations or mechanisms of one or more core network elements to devices or systems that are external to the core network (e.g., to external device 1354 via DN 1350). NEF/SCEF 1349 may maintain authorization and/or authentication information associated with such external devices or systems, such that NEF/SCEF 1349 is able to provide information, that is authorized to be provided, to the external devices or systems. For example, a given external device 1354 may request particular information associated with one or more core network elements. NEF/SCEF 1349 may authenticate the request and/or otherwise verify that external device 1354 is authorized to receive the information, and may request, obtain, or otherwise receive the information from the one or more core network elements. In some embodiments, NEF/SCEF 1349 may include, may implement, may be implemented by, may be communicatively coupled to, and/or may otherwise be associated with a Security Edge Protection Proxy ("SEPP"), which may perform some or all of the functions discussed above. External device 1354 may, in some situations, subscribe to particular types of requested information provided by the one or more core network elements, and the one or more core network elements may provide (e.g., "push") the requested information to NEF/SCEF 1349 (e.g., in a periodic or otherwise ongoing basis).

In some embodiments, external devices 1354 may communicate with one or more elements of RAN 1310 and/or 1312 via an API or other suitable interface. For example, a given external device 1354 may provide instructions, requests, etc. to RAN 1310 and/or 1312 to provide one or more services via one or more respective MECs 1314. In some embodiments, such instructions, requests, etc. may include QoS parameters, Service Level Agreements ("SLAs"), etc. (e.g., maximum latency thresholds, minimum throughput thresholds, etc.) associated with the services.

Figure 14:
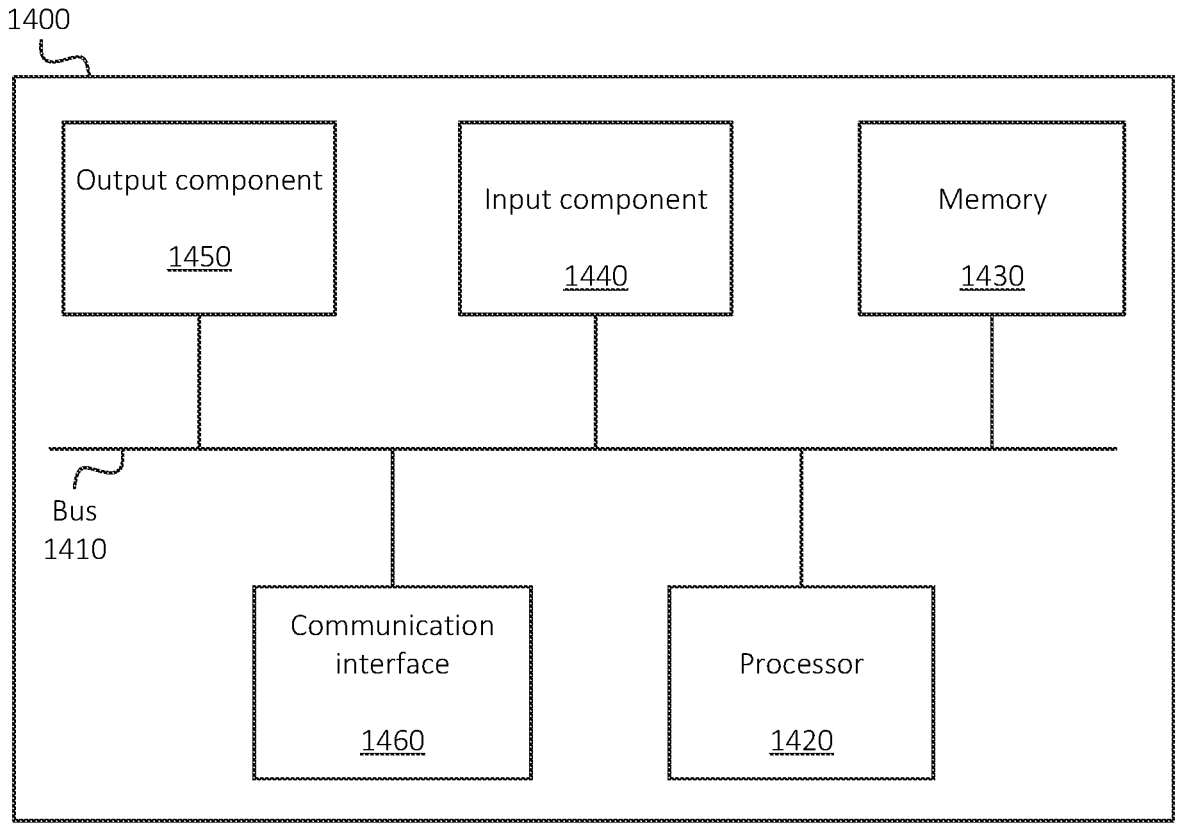
FIG. 14 illustrates example components of one or more devices, in accordance with one or more embodiments described herein.

FIG. 14 illustrates example components of device 1400. One or more of the devices described above may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, a set of provisioned hardware resources of a cloud computing system, or other suitable type of hardware that interprets and/or executes instructions (e.g., processor-executable instructions). In some embodiments, processor 1420 may be or may include one or more hardware processors. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400 and/or other receives or detects input from a source external to input component 1440, such as a touchpad, a touchscreen, a keyboard, a keypad, a button, a switch, a microphone or other audio input component, etc. In some embodiments, input component 1440 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1450 may include a mechanism that outputs information to the operator, such as a display, a speaker, one or more light emitting diodes ("LEDs"), etc.

Communication interface 1460 may include any transceiver-like mechanism that enables device 1400 to communicate with other devices and/or systems (e.g., via RAN 1310, RAN 1312, DN 1350, etc.). For example, communication interface 1460 may include an Ethernet interface, an optical interface, a coaxial interface, or the like. Communication interface 1460 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1400 may include more than one communication interface 1460. For instance, device 1400 may include an optical interface, a wireless interface, an Ethernet interface, and/or one or more other interfaces.

Device 1400 may perform certain operations relating to one or more processes described above. Device 1400 may perform these operations in response to processor 1420 executing instructions, such as software instructions, processor-executable instructions, etc. stored in a computer-readable medium, such as memory 1430. A computer-readable medium may be defined as a non-transitory memory device. A memory device may include space within a single physical memory device or spread across multiple physical memory devices. The instructions may be read into memory 1430 from another computer-readable medium or from another device. The instructions stored in memory 1430 may be processor-executable instructions that cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-12), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

determine, based on wireless metrics associated with wireless signals transmitted by a first set of devices, a first reference map associated with a particular space;

determine, based on the first reference map and further based on wireless metrics associated with wireless signals transmitted by the first set of devices and received by a second set of devices, a second reference map associated with the particular space;

determine, based on the second reference map and further based on wireless metrics associated with wireless signals transmitted by a third set of devices and received by the second set of devices, locations within the particular space of the third set of devices; and output information indicating the locations, within the particular space, of the third set of devices.

2. The device of claim 1, wherein the wireless metrics associated with wireless signals transmitted by the first set of devices and received by a second set of devices include a signal strength, as measured by a particular device of the second set of devices, of wireless signals transmitted by the first set of devices and as received by the particular device of the second set of devices.

3. The device of claim 2, wherein the second reference map is based on the signal strength, as measured by the particular device of the second set of devices, of wireless signals transmitted by the first set of devices and as received by the particular device of the second set of devices.

4. The device of claim 3, wherein the second reference map includes one or more weighted averages that are based on the first reference map and the signal strength, as measured by the particular device of the second set of devices, of wireless signals transmitted by the first set of devices and as received by the particular device of the second set of devices.

5. The device of claim 1, wherein one or more devices, of the third set of devices, do not include a wireless receiver.

6. The device of claim 1, wherein the first reference map represents a fingerprint of the particular space from a standpoint of the first set of devices.

7. The device of claim 1, wherein the second reference map represents a fingerprint of the particular space from a standpoint of the second set of devices.

8. A non-transitory computer-readable medium, storing a plurality of processor-executable instructions to:

determine, based on wireless metrics associated with wireless signals transmitted by a first set of devices, a first reference map associated with a particular space;

determine, based on the first reference map and further based on wireless metrics associated with wireless signals transmitted by the first set of devices and received by a second set of devices, a second reference map associated with the particular space;

determine, based on the second reference map and further based on wireless metrics associated with wireless signals transmitted by a third set of devices, locations within the particular space of the third set of devices; and output information indicating the locations, within the particular space, of the third set of devices.

9. The non-transitory computer-readable medium of claim 8, wherein the wireless metrics associated with wireless signals transmitted by the first set of devices and received by a second set of devices include a signal strength, as measured by a particular device of the second set of devices, of wireless signals transmitted by the first set of devices and as received by the particular device of the second set of devices.

10. The non-transitory computer-readable medium of claim 9, wherein the second reference map is based on the signal strength, as measured by the particular device of the second set of devices, of wireless signals transmitted by the first set of devices and as received by the particular device of the second set of devices.

11. The non-transitory computer-readable medium of claim 10, wherein the second reference map includes one or more weighted averages that are based on the first reference map and the signal strength, as measured by the particular device of the second set of devices, of wireless signals transmitted by the first set of devices and as received by the particular device of the second set of devices.

12. The non-transitory computer-readable medium of claim 8, wherein one or more devices, of the third set of devices, do not include a wireless receiver.

13. The non-transitory computer-readable medium of claim 8, wherein the first reference map represents a fingerprint of the particular space from a standpoint of the first set of devices.

14. The non-transitory computer-readable medium of claim 8, wherein the second reference map represents a fingerprint of the particular space from a standpoint of the second set of devices.

15. A method, comprising:

determining, based on wireless metrics associated with wireless signals transmitted by a first set of devices, a first reference map associated with a particular space;

determining, based on the first reference map and further based on wireless metrics associated with wireless signals transmitted by the first set of devices and received by a second set of devices, a second reference map associated with the particular space;

determining, based on the second reference map and further based on wireless metrics associated with wireless signals transmitted by a third set of devices and received by the second set of devices, locations within the particular space of the third set of devices; and outputting information indicating the locations, within the particular space, of the third set of devices.

16. The method of claim 15, wherein the wireless metrics associated with wireless signals transmitted by the first set of devices and received by a second set of devices include a signal strength, as measured by a particular device of the second set of devices, of wireless signals transmitted by the first set of devices and as received by the particular device of the second set of devices.

17. The method of claim 16, wherein the second reference map is based on the signal strength, as measured by the particular device of the second set of devices, of wireless signals transmitted by the first set of devices and as received by the particular device of the second set of devices.

18. The method of claim 17, wherein the second reference map includes one or more weighted averages that are based on the first reference map and the signal strength, as measured by the particular device of the second set of devices, of wireless signals transmitted by the first set of devices and as received by the particular device of the second set of devices.

19. The method of claim 15, wherein one or more devices, of the third set of devices, do not include a wireless receiver.

20. The method of claim 15, wherein the first reference map represents a fingerprint of the particular space from a standpoint of the first set of devices, and wherein the second reference map represents a fingerprint of the particular space from a standpoint of the second set of devices.

* * * * *